US011932398B2

(12) United States Patent
Campana et al.

(10) Patent No.: US 11,932,398 B2
(45) Date of Patent: Mar. 19, 2024

(54) HORIZONTAL STABILIZER ASSEMBLY FOR AN AIRCRAFT

(71) Applicant: THE BOEING COMPANY, Chicago, IL (US)

(72) Inventors: Joseph H. Campana, Mill Creek, WA (US); Kevin P. Ryder, Kirkland, WA (US); William H. Pearson, Redmond, WA (US); James R. Harrison, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/306,015

(22) Filed: May 3, 2021

(65) Prior Publication Data

US 2022/0055735 A1 Feb. 24, 2022

Related U.S. Application Data

(60) Provisional application No. 63/069,186, filed on Aug. 24, 2020.

(51) Int. Cl.
*B64C 5/02* (2006.01)
*B64F 5/10* (2017.01)

(52) U.S. Cl.
CPC . *B64C 5/02* (2013.01); *B64F 5/10* (2017.01)

(58) Field of Classification Search
CPC .. B64C 5/02; B64C 1/26; B64C 3/185; B64C 3/187
See application file for complete search history.

(56) References Cited

U.S. PATENT DOCUMENTS

| 8,348,196 B2 | 1/2013 | Campana |
| 10,046,848 B2 | 8/2018 | Folch Cortes et al. |
| 2010/0155532 A1 | 6/2010 | Ariza Martin et al. |
| 2011/0089292 A1 | 4/2011 | Williams et al. |
| 2011/0174928 A1* | 7/2011 | Martinez Fernandez ............ B64C 1/26 244/131 |
| 2012/0043422 A1* | 2/2012 | Campana ............... B64C 1/26 244/123.1 |

(Continued)

FOREIGN PATENT DOCUMENTS

| CN | 109720544 A | 5/2019 |
| EP | 2444315 A2 | 4/2012 |

(Continued)

OTHER PUBLICATIONS https://www.researchgate.net/figure/Airbus-A300-600-vertical-stabilizer-construction_fig1_279693318, Jan. 2006.

(Continued)

*Primary Examiner* — Tien Q Dinh
*Assistant Examiner* — William L Gmoser
(74) *Attorney, Agent, or Firm* — Quinn IP Law

(57) ABSTRACT

A horizontal stabilizer assembly includes a stabilizer connector assembly having a center multi-spar box, a first horizontal stabilizer having a first multi-spar box connected to a first side of the center multi-spar box with a plurality of first lug and clevis connections, and a second horizontal stabilizer having a second multi-spar box connected to a second side of the center multi-spar box, opposite the first side, with a plurality of second lug and clevis connections.

23 Claims, 20 Drawing Sheets

(56) References Cited

U.S. PATENT DOCUMENTS

| | | |
|---|---|---|
| 2017/0232662 A1* | 8/2017 | Bailly .................... B29C 65/48 244/123.1 |
| 2020/0023934 A1 | 1/2020 | Martino-Gonzalez et al. |
| 2020/0156758 A1 | 5/2020 | Colmenarejo Matellano et al. |

FOREIGN PATENT DOCUMENTS

| | | |
|---|---|---|
| EP | 3078586 A1 | 10/2016 |
| EP | 3584152 A1 | 12/2019 |
| EP | 3653490 A1 | 5/2020 |

OTHER PUBLICATIONS

Communication Pursuant to Rule 62 EPC for EP Application No. 21169331.2 dated Oct. 14, 2021.

Extended European Search Report for EP Application No. 21183492.4 dated Jan. 18, 2022.

\* cited by examiner

US 11,932,398 B2

HORIZONTAL STABILIZER ASSEMBLY FOR AN AIRCRAFT

CROSS-REFERENCE TO RELATED APPLICATIONS

This application claims priority to U.S. Provisional Patent Application No. 63/069,186, entitled "Horizontal Stabilizer Assembly For An Aircraft" and filed Aug. 24, 2020, the entire disclosure of which is hereby incorporated by reference herein.

FIELD

This disclosure relates generally to aircraft and, more specifically, to horizontal stabilizer assemblies having multi-spar boxes for aircraft.

BACKGROUND

Current horizontal stabilizers assemblies that use multi-spar boxes in the horizontal stabilizers are manufactured by connecting first and second horizontal stabilizers directly to each other or to a centerbox with splice plates and lap shear joints. However, these configurations create confined space joints that are difficult to access, which can increase the difficulty and cost of manufacture and assembly and are not scalable. In addition, the current joints between the horizontal stabilizers or the horizontal stabilizers and the centerbox require that the joint be completed prior to the joining to the pivot bulkhead.

Therefore, there is a need for a horizontal stabilizer assembly for aircraft that uses multi-spar boxes in the horizontal stabilizers and does not have confined space joints, that is easier and less costly to manufacture and assemble, and that is scalable.

SUMMARY

In one example of the present disclosure, a horizontal stabilizer assembly comprises a stabilizer connector assembly having a center multi-spar box, a first horizontal stabilizer having a first multi-spar box connected to a first side of the center multi-spar box with a plurality of first lug and clevis connections, and a second horizontal stabilizer having a second multi-spar box connected to a second side of the center multi-spar box, opposite the first side, with a plurality of second lug and clevis connections.

In one example, in the horizontal stabilizer assembly of the previous example, the plurality of first lug and clevis connections include a plurality of pairs of aligned lugs extending from a first side of the center multi-spar box and defining clevises, a plurality of lugs extending from the first multi-spar box of the first horizontal stabilizer and corresponding to the pairs of aligned lugs, and retaining members inserted through the pairs of aligned lugs of the center multi-spar box and corresponding lugs of the first multi-spar box. The plurality of second lug and clevis connections include a plurality of pairs of aligned lugs extending from a second side of the center multi-spar box and defining clevises, a plurality of lugs extending from the second multi-spar box of the second horizontal stabilizer and corresponding to the pairs of aligned lugs, and retaining members inserted through the pairs of aligned lugs of the center multi-spar box and corresponding lugs of the second multi-spar box.

In one example, in the horizontal stabilizer assembly of any of the previous examples, the center multi-spar box comprises a front spar, a rear spar, at least one mid spar positioned between and spaced apart from the front spar and the rear spar, a top skin extending between the front spar and the rear spar, and a bottom skin, opposite the top skin, extending between the front and rear spar.

In one example, in the horizontal stabilizer assembly of any of the previous embodiments, the stabilizer connector assembly comprises first and second base rib assemblies and first, second, third, and fourth side plates. The first base rib assembly is secured to the first side of the center multi-spar box and includes a pair of aligned front lateral lugs positioned along a front of the first base rib assembly, a pair of aligned rear lateral lugs positioned along a rear of the first base rib assembly, at least one pair of opposing middle longitudinal lugs disposed along a top of the first base rib assembly and a bottom of the first base rib assembly and between the front lateral lugs and the rear lateral lugs. The first side plate is adjacent an exterior surface of the top skin, is secured to the top skin and the first base rib assembly, and has at least one longitudinal lug aligned with and spaced apart from one of the pair of opposing middle longitudinal lugs of the first base rib assembly. The second side plate is adjacent an exterior surface of the bottom skin, is secured to the bottom skin and the first base rib assembly, and has at least one longitudinal lug aligned with and spaced apart from the other of the pair of opposing middle longitudinal lugs of the first base rib assembly. The pair of front lateral lugs, the pair of rear lateral lugs, and the pair of opposing middle longitudinal lugs with the first and second side plates define a plurality of clevises of the first lug and clevis connections. The second base rib assembly is secured to the second side of the center multi-spar box and includes a pair of aligned front lateral lugs positioned along a front of the second base rib assembly, a pair of aligned rear lateral lugs positioned along a rear of the second base rib assembly, at least one pair of opposing middle longitudinal lugs disposed along a top of the second base rib assembly and a bottom of the second base rib assembly and between the front lateral lugs and the rear lateral lugs. The third side plate is adjacent an exterior surface of the top skin, is secured to the top skin and the second base rib assembly, and has at least one longitudinal lug aligned with and spaced apart from one of the pair of opposing middle longitudinal lugs of the second base rib assembly. The fourth side plate is adjacent an exterior surface of the bottom skin, is secured to the bottom skin and the second base rib assembly, and has at least one longitudinal lug aligned with and spaced apart from the other of the pair of opposing middle longitudinal lugs of the second base rib assembly. The pair of front lateral lugs, the pair of rear lateral lugs, and the pair of opposing middle longitudinal lugs with the first and second side plates define a plurality of clevises of the second lug and clevis connections.

In one example, in the horizontal stabilizer assembly of any of the previous examples, the first horizontal stabilizer comprises a third base rib assembly secured to the first multi-spar box and the second horizontal stabilizer comprises a fourth base rib assembly secured to the second multi-spar box. The third base rib assembly includes a front lateral lug positioned along a front of the third base rib assembly, a rear lateral lug positioned along a rear of the third base rib assembly, at least one pair of opposing middle longitudinal lugs disposed along a top of the third base rib assembly and a bottom of the third base rib assembly and between the front lateral lug and the rear lateral lug, wherein the front lateral lug, the rear lateral lug, and the pair of opposing middle longitudinal lugs define a plurality of lugs of the first lug and clevis connections. The fourth base rib assembly includes a front lateral lug positioned along a front of the fourth base rib assembly, a rear lateral lug positioned along a rear of the fourth base rib assembly, at least one pair of opposing middle longitudinal lugs disposed along a top of the fourth base rib assembly and a bottom of the fourth base rib assembly and between the front lateral lug and the rear lateral lug, wherein the front lateral lug, the rear lateral lug, and the pair of opposing middle longitudinal lugs define a plurality of lugs of the second lug and clevis connections.

In one example, in the horizontal stabilizer assembly of any of the previous examples, the first multi-spar box of the first horizontal stabilizer includes a front spar, a rear spar, at least one mid spar positioned between and spaced apart from the front spar and the rear spar, a top skin extending between the front spar and the rear spar, and a bottom skin, opposite the top skin, extending between the front and rear spar and the first horizontal stabilizer includes a first pivot joint secured to the rear spar and a first plurality of riblets longitudinally aligned between the spars and with the first pivot joint. The second multi-spar box of the second horizontal stabilizer includes a front spar, a rear spar, at least one mid spar positioned between and spaced apart from the front spar and the rear spar, a top skin extending between the front spar and the rear spar, and a bottom skin, opposite the top skin, extending between the front and rear spar and the second horizontal stabilizer includes a second pivot joint secured to the rear spar and a second plurality of riblets longitudinally aligned between the spars and with the second pivot joint.

In one example, in the horizontal stabilizer assembly of any of the previous examples, the center multi-spar box comprises a front spar, a rear spar, at least one mid spar positioned between and spaced apart from the front spar and the rear spar, a top skin extending between the front spar and the rear spar, and a bottom skin, opposite the top skin, extending between the front and rear spar. The stabilizer connector assembly includes first and second trim actuator fittings secured to the front spar, a third plurality of riblets longitudinally aligned between the spars and with the first trim actuator fitting, and a fourth plurality of riblets longitudinally aligned between the spars and with the second trim actuator fitting.

In one example, in the horizontal stabilizer assembly of any of the previous examples, the center multi-spar box comprises a front spar, a rear spar, at least one mid spar positioned between and spaced apart from the front spar and the rear spar, a top skin extending between the front spar and the rear spar, and a bottom skin, opposite the top skin, extending between the front and rear spar. The stabilizer connector assembly includes first and second trim actuator fittings secured to the front spar, first and second pivot joints secured to the rear spar, a first plurality of riblets longitudinally aligned between the spars and with the first trim actuator fitting and the first pivot joint, and a second plurality of riblets longitudinally aligned between the spars and with the second trim actuator fitting and the second pivot joint.

In one example, an aircraft including the horizontal stabilizer assembly of any of the previous examples comprises an aircraft fuselage having a plurality of frame members and an outer skin, wherein the stabilizer connector assembly is positioned within the aircraft fuselage and is interconnected to one or more frame members.

In another example of the present disclosure, a horizontal stabilizer assembly comprises a stabilizer connector assembly, first and second horizontal stabilizers, and first, second, third, and fourth base rib assemblies, and a plurality of retaining members. The stabilizer connector assembly has a center multi-spar box. The first base rib assembly is secured to a first side of the center multi-spar box, the first base rib assembly including a pair of aligned front lateral lugs positioned along a front of the first base rib assembly, a pair of aligned rear lateral lugs positioned along a rear of the first base rib assembly, and at least one pair of opposing middle longitudinal lugs disposed along a top of the first base rib assembly and a bottom of the first base rib assembly and between the front lateral lugs and the rear lateral lugs. The second base rib assembly is secured to a second side of the center multi-spar box, the second base rib assembly including a pair of aligned front lateral lugs positioned along a front of the second base rib assembly, a pair of aligned rear lateral lugs positioned along a rear of the second base rib assembly, at least one pair of opposing middle longitudinal lugs disposed along a top of the second base rib assembly and a bottom of the second base rib assembly and between the front lateral lugs and the rear lateral lugs. The first horizontal stabilizer has a first multi-spar box. The third base rib assembly secured to the first multi-spar box, the third base rib assembly including a front lateral lug positioned along a front of the third base rib assembly, a rear lateral lug positioned along a rear of the third base rib assembly, at least one pair of opposing middle longitudinal lugs disposed along a top of the third base rib assembly and a bottom of the third base rib assembly and between the front lateral lug and the rear lateral lug. The second horizontal stabilizer has a second multi-spar box. The fourth base rib assembly including a front lateral lug positioned along a front of the fourth base rib assembly, a rear lateral lug positioned along a rear of the fourth base rib assembly, at least one pair of opposing middle longitudinal lugs disposed along a top of the fourth base rib assembly and a bottom of the fourth base rib assembly and between the front lateral lug and the rear lateral lug. The plurality of retaining members inserted through mounting holes in corresponding lugs in the first and third base ribs and through mounting holes in corresponding lugs of the second and fourth base ribs to secure the first horizontal stabilizer and the second horizontal stabilizer to the stabilizer connector assembly.

In one example, in the horizontal stabilizer assembly of the previous example, the center multi-spar box includes a front spar, a rear spar, at least one mid spar positioned between and spaced apart from the front spar and the rear spar, a top skin extending between the front spar and the rear spar, and a bottom skin, opposite the top skin, extending between the front and rear spar. The first multi-spar box includes a front spar, a rear spar, at least one mid spar positioned between and spaced apart from the front and rear spars, a top skin extending between the front and rear spar, and a bottom skin, opposite the top skin, extending between the front and rear spar. The second multi-spar box includes a front spar, a rear spar, at least one mid spar positioned between and spaced apart from the front and rear spars, a top skin extending between the front and rear spar, and a bottom skin, opposite the top skin, extending between the front and rear spar.

In one example, in the horizontal stabilizer assembly of the previous examples, the horizontal stabilizer assembly comprises first, second, third, and fourth side plates. The first side plate is adjacent an exterior surface of the top skin of the center multi-spar box and is secured to the top skin and the first base rib assembly, the first side plate having at least one longitudinal lug aligned with and spaced apart from one of the pair of opposing middle longitudinal lugs of the first base rib assembly. The second side plate is adjacent an exterior surface of the bottom skin of the center multi-spar box and is secured to the bottom skin and the first base rib assembly, the second side plate having at least one longitudinal lug aligned with and spaced apart from the other of the pair of opposing middle longitudinal lugs of the first base rib assembly. The third side plate is adjacent an exterior surface of the top skin and is secured to the top skin and the second base rib assembly, the third side plate having at least one longitudinal lug aligned with and spaced apart from one of the pair of opposing middle longitudinal lugs of the second base rib assembly. The fourth side plate is adjacent an exterior surface of the bottom skin and is secured to the bottom skin and the second base rib assembly, the fourth side plate having at least one longitudinal lug aligned with and spaced apart from the other of the pair of opposing middle longitudinal lugs of the second base rib assembly.

In one example, in the horizontal stabilizer assembly of any of the previous examples, the first horizontal stabilizer includes a first pivot joint secured to the rear spar and a first plurality of riblets longitudinally aligned between the spars and with the first pivot joint and the second horizontal stabilizer includes a second pivot joint secured to the rear spar and a second plurality of riblets longitudinally aligned between the spars and with the second pivot joint.

In one example, in the horizontal stabilizer assembly of any of the previous examples, the stabilizer connector assembly includes first and second trim actuator fittings secured to the front spar of the center multi-spar box, a third plurality of riblets longitudinally aligned between the spars and with the first trim actuator fitting, and a fourth plurality of riblets longitudinally aligned between the spars and with the second trim actuator fitting.

In one example, in the horizontal stabilizer assembly of any of the previous examples, the stabilizer connector assembly includes first and second trim actuator fittings secured to the front spar of the center multi-spar box, first and second pivot joints secured to the rear spar of the center multi-spar box, a first plurality of riblets longitudinally aligned between the spars and with the first trim actuator fitting and the first pivot joint, and a second plurality of riblets longitudinally aligned between the spars and with the second trim actuator fitting and the second pivot joint.

In one example, an aircraft including the horizontal stabilizer assembly of any of the previous examples comprises an aircraft fuselage having a plurality of frame members and an outer skin, wherein the stabilizer connector assembly is positioned within the aircraft fuselage and is interconnected to one or more frame members.

In another example of the present disclosure, a method of assembling a horizontal stabilizer assembly for an aircraft comprises the steps of: assembling first and second base rib assemblies, each of the first and second base rib assemblies including a plurality of lugs; positioning the first base rib assembly adjacent a first side of a center multi-spar box of a stabilizer connector assembly and the second base rib assembly adjacent a second side of the center multi-spar box, opposite the first side; positioning a plurality of side plates corresponding to the plurality of lugs of the first and second base rib assemblies adjacent the center multi-spar box and securing the plurality of side plates to the center multi-spar box and the first base rib assembly, the plurality of side plates having at least one longitudinal lug aligned with and spaced apart from one of the plurality of lugs of the first and second base rib assemblies; assembling third and fourth base rib assemblies, each of the third and fourth base rib assemblies including a plurality of lugs; positioning the third base rib assembly adjacent a first multi-spar box of a first horizontal stabilizer and securing the third base rib assembly to the first multi-spar box and positioning the fourth base rib assembly adjacent a second multi-spar box of a second horizontal stabilizer and securing the fourth base rib assembly to the second multi-spar box; positioning the first horizontal stabilizer adjacent the first side of the center multi-spar box and the second horizontal stabilizer adjacent the second side of the center multi-spar box; and inserting retaining members through mounting holes in corresponding lugs in the first and third base rib assemblies and through mounting holes in corresponding lugs of the second and fourth base rib assemblies to secure the first horizontal stabilizer and the second horizontal stabilizer to the stabilizer connector assembly.

In one example, in the method of the previous example, the plurality of lugs of the first and second base rib assemblies comprise a pair of aligned front lateral lugs positioned along a front of the first and second base rib assemblies, a pair of aligned rear lateral lugs positioned along a rear of the first and second base rib assemblies, and at least one pair of opposing middle longitudinal lugs disposed along a top of the first and second base rib assemblies and a bottom of the first and second base rib assemblies and between the front lateral lugs and the rear lateral lugs; the plurality of side plates comprise a first side plate, a second side plate, a third side plate, and a fourth side plate; and the plurality of lugs of the third and fourth base rib assemblies comprise a front lateral lug positioned along a front of the third and fourth base rib assemblies, a rear lateral lug positioned along a rear of the third and fourth base rib assemblies, at least one pair of opposing middle longitudinal lugs disposed along a top of the third and fourth base rib assemblies and a bottom of the third base rib assembly and between the front lateral lug and the rear lateral lug.

In one example, in the method of the previous example, the method comprises the steps of: assembling the first and second base rib assemblies comprises: attaching at least one first side chord to a base rib, the at least one first side chord including at least one of the longitudinal lugs; attaching at least one second side chord to the base rib, opposite the at least one first side chord, the at least one second side chord including at least one of the longitudinal lugs; attaching a front terminal fitting to the base rib, the front terminal fitting including the pair of aligned front lateral lugs; and attaching a rear terminal fitting to the base rib, opposite the front terminal fitting, the rear terminal fitting including the pair of aligned rear lateral lugs; and assembling the third and fourth base rib assemblies comprises: attaching at least one first side chord to a base rib, the at least one first side chord including at least one of the longitudinal lugs; attaching at least one second side chord to the base rib, opposite the at least one first side chord, the at least one second side chord including at least one of the longitudinal lugs; attaching a front terminal fitting to the base rib, the front terminal fitting including the front lateral lug; and attaching a rear terminal fitting to the base rib, opposite the front terminal fitting, the rear terminal fitting including the rear lateral lug.

In one example, in the method of the previous example, the center multi-spar box includes a front spar, a rear spar, at least one mid spar positioned between and spaced apart from the front spar and the rear spar, a top skin extending between the front spar and the rear spar, and a bottom skin, opposite the top skin, extending between the front and rear spar; the first multi-spar box includes a front spar, a rear spar, at least one mid spar positioned between and spaced apart from the front spar and the rear spar, a top skin extending between the front spar and the rear spar, and a bottom skin, opposite the top skin, extending between the front and rear spar; and the second multi-spar box includes a front spar, a rear spar, at least one mid spar positioned between and spaced apart from the front spar and the rear spar, a top skin extending between the front spar and the rear spar, and a bottom skin, opposite the top skin, extending between the front and rear spar.

In one example, in the method of any of the previous examples, the method comprises the steps of: securing a first pivot joint to the rear spar of the first multi-spar box and securing one of a first plurality of riblets between each spar of the first multi-spar box, the first plurality riblets being longitudinally aligned with each other and aligned with the first pivot joint; and securing a second pivot joint to the rear spar of the second multi-spar box and securing one of a second plurality of riblets between each spar of the second multi-spar box, the second plurality of riblets being longitudinally aligned with each other and aligned with the second pivot joint.

In one example, in the method of any of the previous examples, the method comprises the steps of: securing first and second trim actuator fittings to the front spar of the center multi-spar box; securing one of a third plurality of riblets between each spar of the center multi-spar box, the third plurality of riblets being longitudinally aligned with each other and with the first trim actuator fitting; and securing one of a fourth plurality of riblets between each spar of the center multi-spar box, the fourth plurality of riblets being longitudinally aligned with each other and with the second trim actuator fitting.

In one example, in the method of any of the previous examples, the method comprises the steps of: securing first and second trim actuator fittings to the front spar of the center multi-spar box; securing first and second pivot joints to the rear spar of the center multi-spar box; securing one of a first plurality of riblets between each spar of the center multi-spar box, the first plurality of riblets being longitudinally aligned with each other and with the first trim actuator fitting and the first pivot joint; and securing one of a second plurality of riblets between each spar of the center multi-spar box, the second plurality of riblets being longitudinally aligned with each other and with the second trim actuator fitting and the second pivot joint.

The features, functions, and advantages that have been discussed can be achieved independently in various examples or may be combined in yet other examples further details of which can be seen with reference to the following description and drawings.

DESCRIPTION

The horizontal stabilizer assemblies for aircraft described herein include a central stabilizer connector assembly and first (left) and second (right) horizontal stabilizers that are secured to the central stabilizer connector assemblies with lug and clevis connections. The various examples described herein allows at least three optional joint configurations depending on the required weight and production system requirements and solves various issues created by current confined space joints for multi-spar boxes, which provides the potential for cost savings and scalability.

Figure 1:
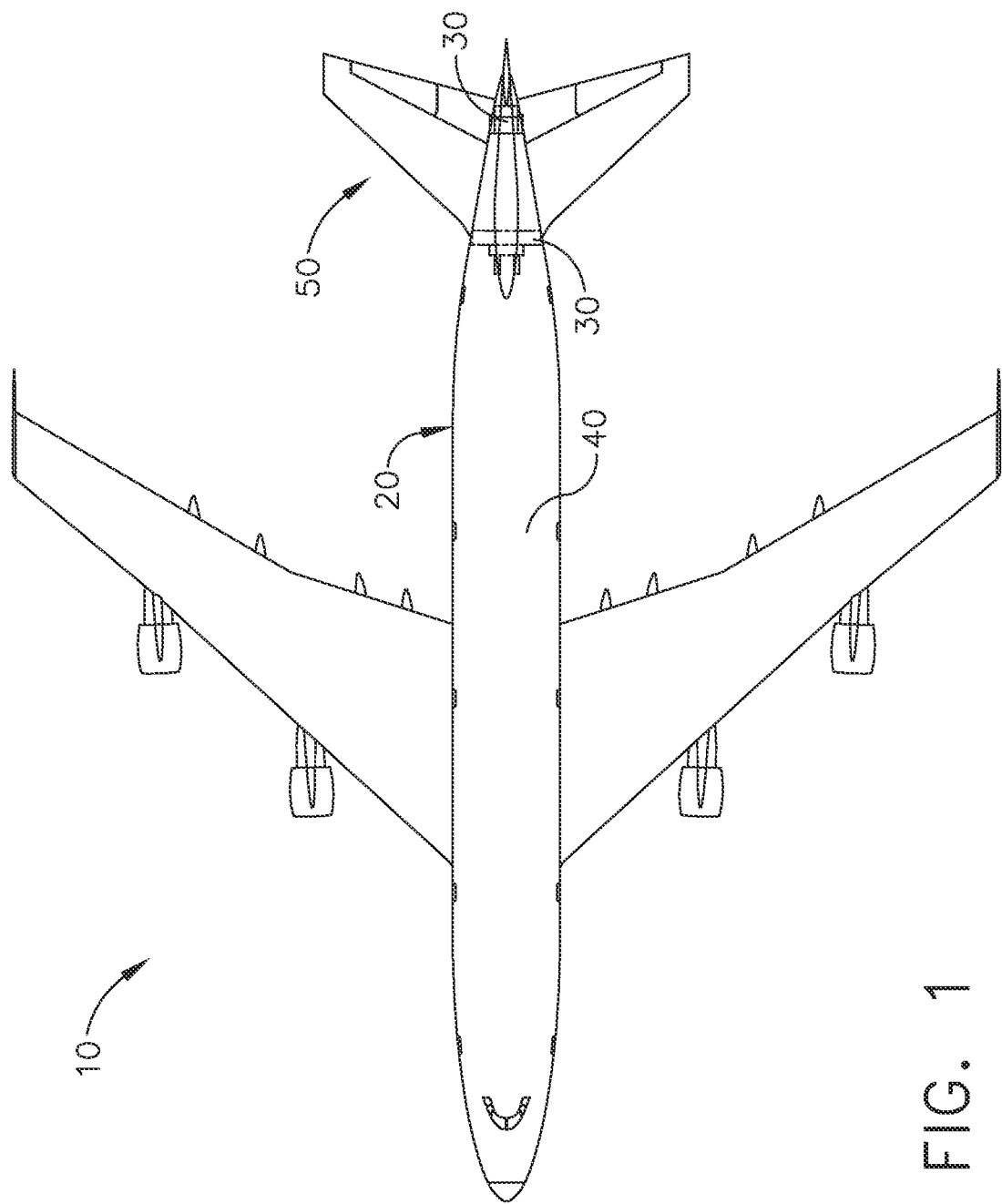
FIG. 1 is a top view of an example aircraft.
Figure 2:
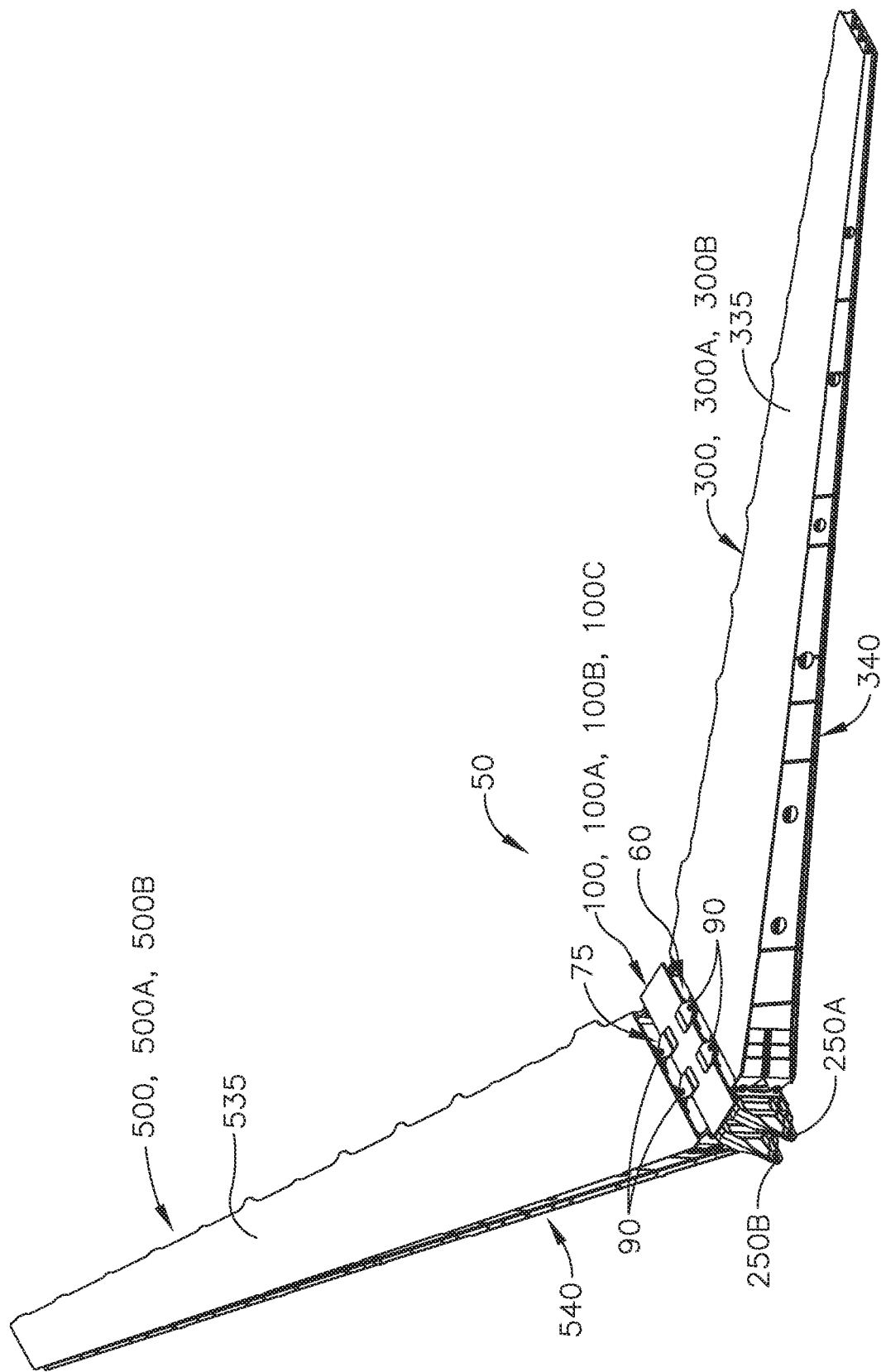
FIG. 2 is a front perspective view of an example horizontal stabilizer assembly of the aircraft of FIG. 1.
Figure 3:
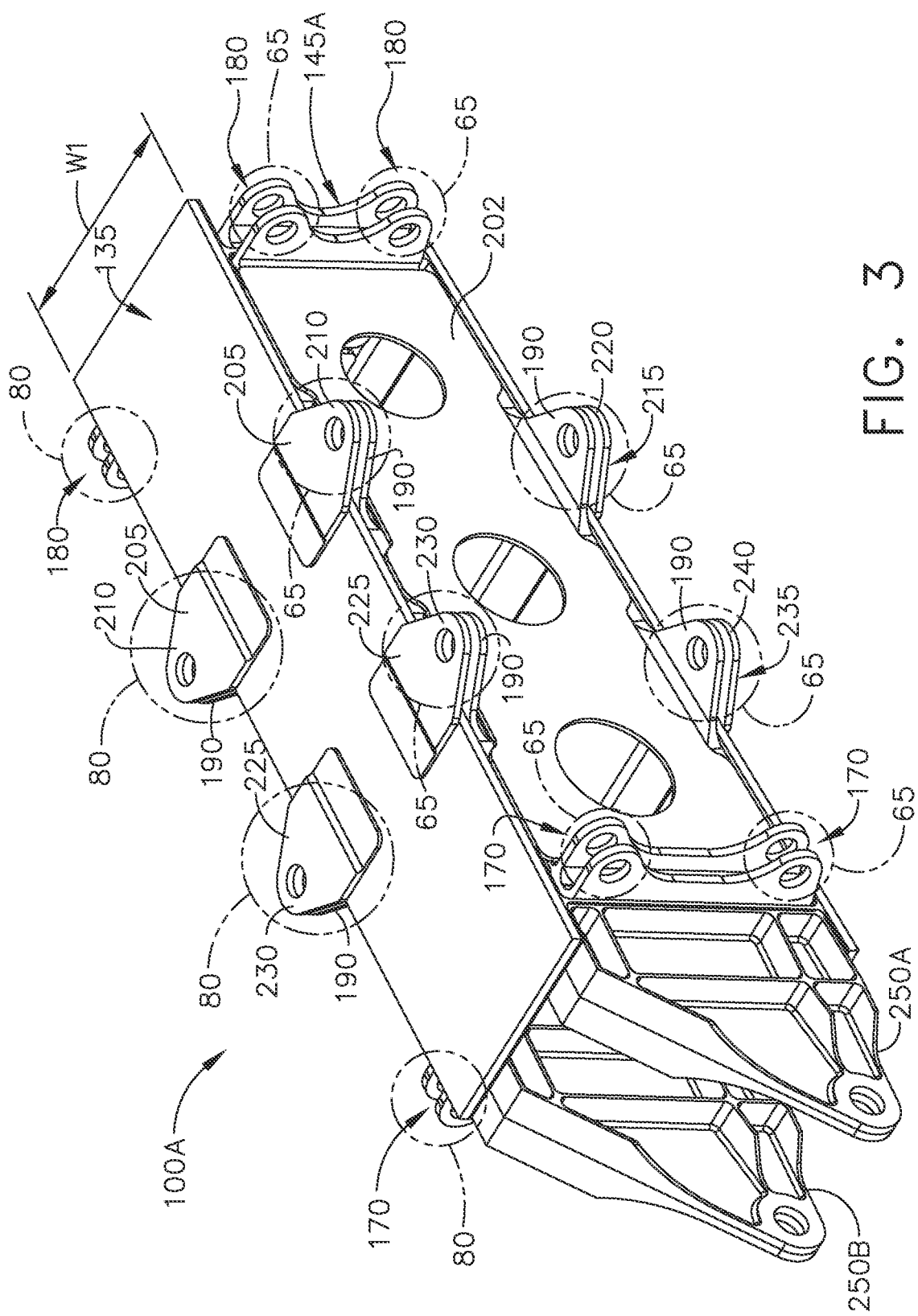
FIG. 3 is a front, right perspective view of a first example stabilizer connector assembly of the horizontal stabilizer assembly of FIG. 2.
Figure 4:
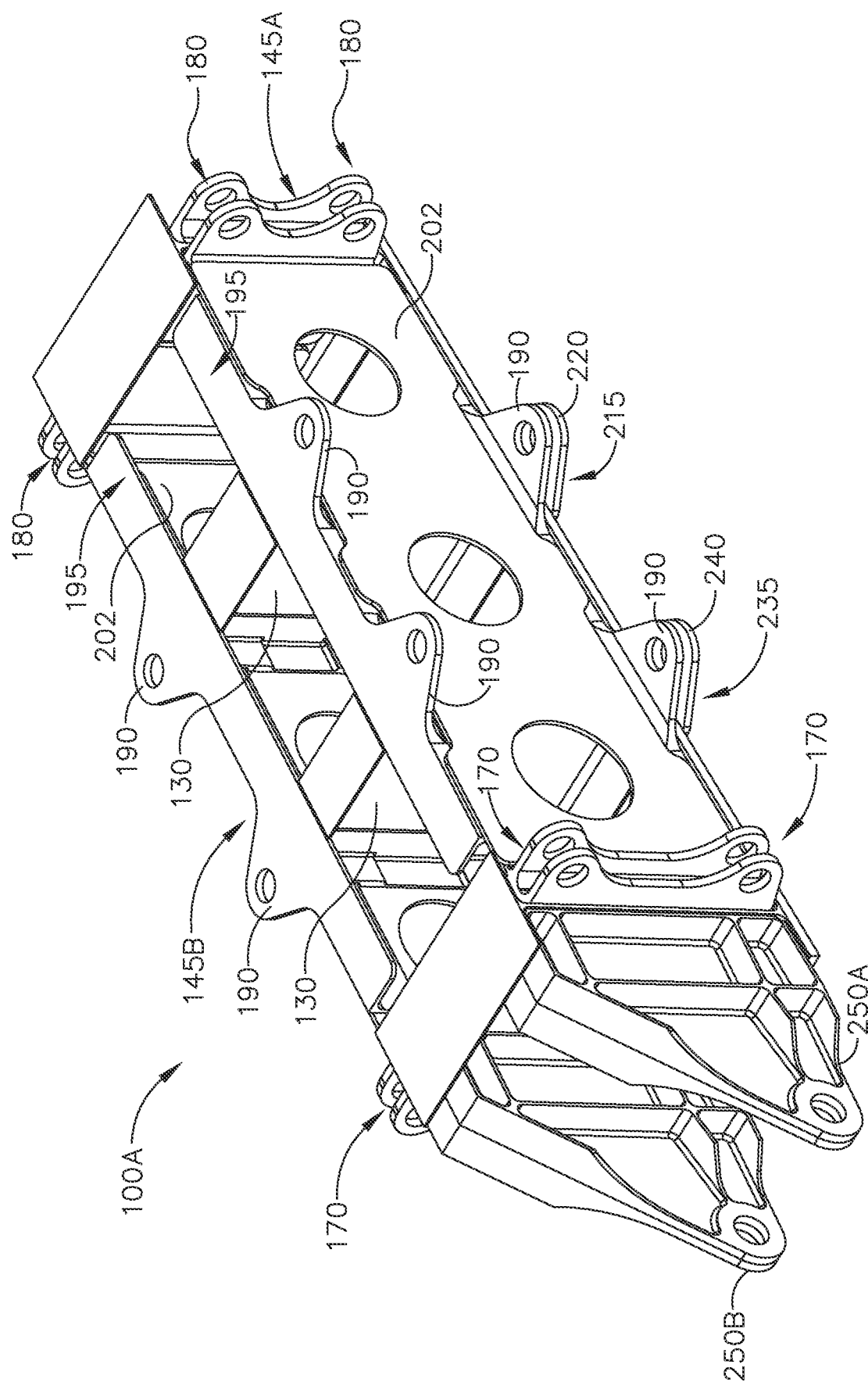
FIG. 4 is a front, right perspective view of the stabilizer connector assembly of FIG. 3 with the top skin removed.
Figure 5:
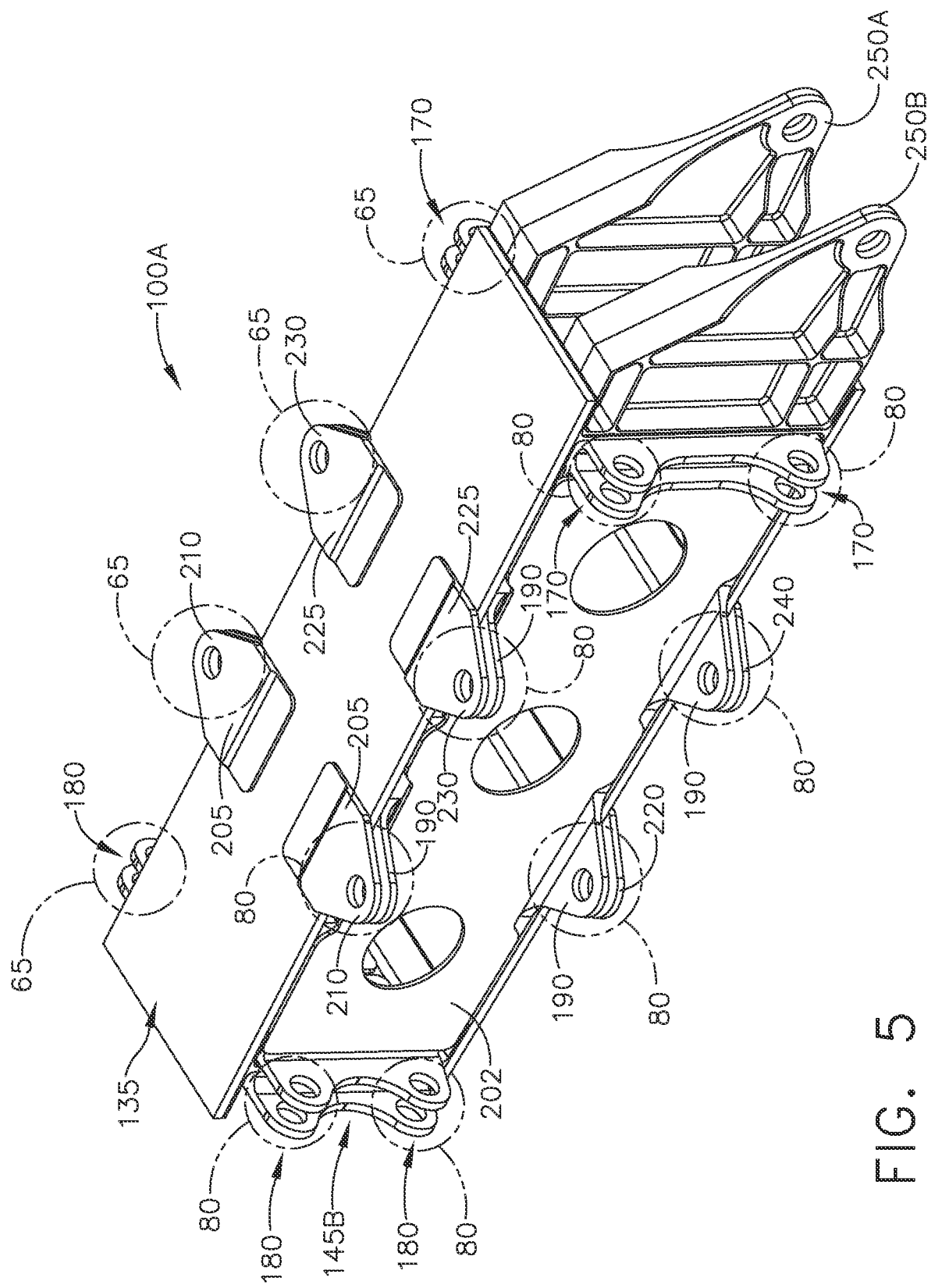
FIG. 5 is a front, left perspective view of the stabilizer connector assembly of FIG. 3.

Referring to FIGS. 1-2, an example aircraft 10 is illustrated having an aircraft fuselage 20, including a plurality of frame members 30 and an outer skin 40, and a horizontal stabilizer assembly 50 positioned within aircraft fuselage 20 and connected to one or more frame members 30. As shown in FIG. 2, horizontal stabilizer assembly 50 includes a stabilizer connector assembly 100 having a center multi-spar box 105, a first horizontal stabilizer 300 having a first multi-spar box 305 connected to a first side 110 of center multi-spar box 105 with a plurality of first lug and clevis connections 60, and a second horizontal stabilizer 500 having a second multi-spar box 505 connected to a second side 115 of center multi-spar box 105, opposite first side 110, with a plurality of second lug and clevis connections 75. First lug and clevis connections 60 include a plurality of pairs of aligned lugs 65 that extend from first side 110 of center multi-spar box 105 and define the clevises of first lug and clevis connections 60, a plurality of lugs 70 that extend from first multi-spar box 305 of first horizontal stabilizer 300 and correspond to each pair of aligned lugs 65, and a plurality of retaining members 90 that are inserted through mounting holes in aligned lugs 65 and lugs 70 to secure first horizontal stabilizer 300 to stabilizer connector assembly 100. Similarly, second lug and clevis connections 75 include a plurality of pairs of aligned lugs 80 that extend from second side 115 of center multi-spar box 105 and define the clevises of second lug and clevis connections 75, a plurality of lugs 85 that extend from second multi-spar box 505 of second horizontal stabilizer 500 and correspond to each pair of aligned lugs 80, and a plurality of retaining members 90 that are inserted through mounting holes in aligned lugs 80 and lugs 85 to secure second horizontal stabilizer 500 to stabilizer connector assembly 100.

Referring to FIGS. 3-6, a first example stabilizer connector assembly 100A is shown that can be used in horizontal stabilizer assembly 50 in FIG. 2. Stabilizer connector assembly 100A generally includes center multi-spar box 105, a first base rib assembly 145A secured to first side 110 of center multi-spar box 105, and a second base rib assembly 145B secured to second side 115 of center multi-spar box 105, opposite first side 110.

Center multi-spar box 105 has a front spar 120, a rear spar 125, and at least one mid spar 130 that is positioned between and spaced apart from front spar 120 and rear spar 125. A top skin 135 extends between front spar 120 and rear spar 125 and a bottom skin 140 extends between front spar 120 and rear spar 125 on an opposite side of center multi-spar box 105 from top skin 135. First and second trim actuator fittings 250A, 250B are secured to and extend from front spar 120 of center multi-spar box 105 to connect center multi-spar box 105 to one or more frame members 30 through an actuator (not shown).

Figure 6:
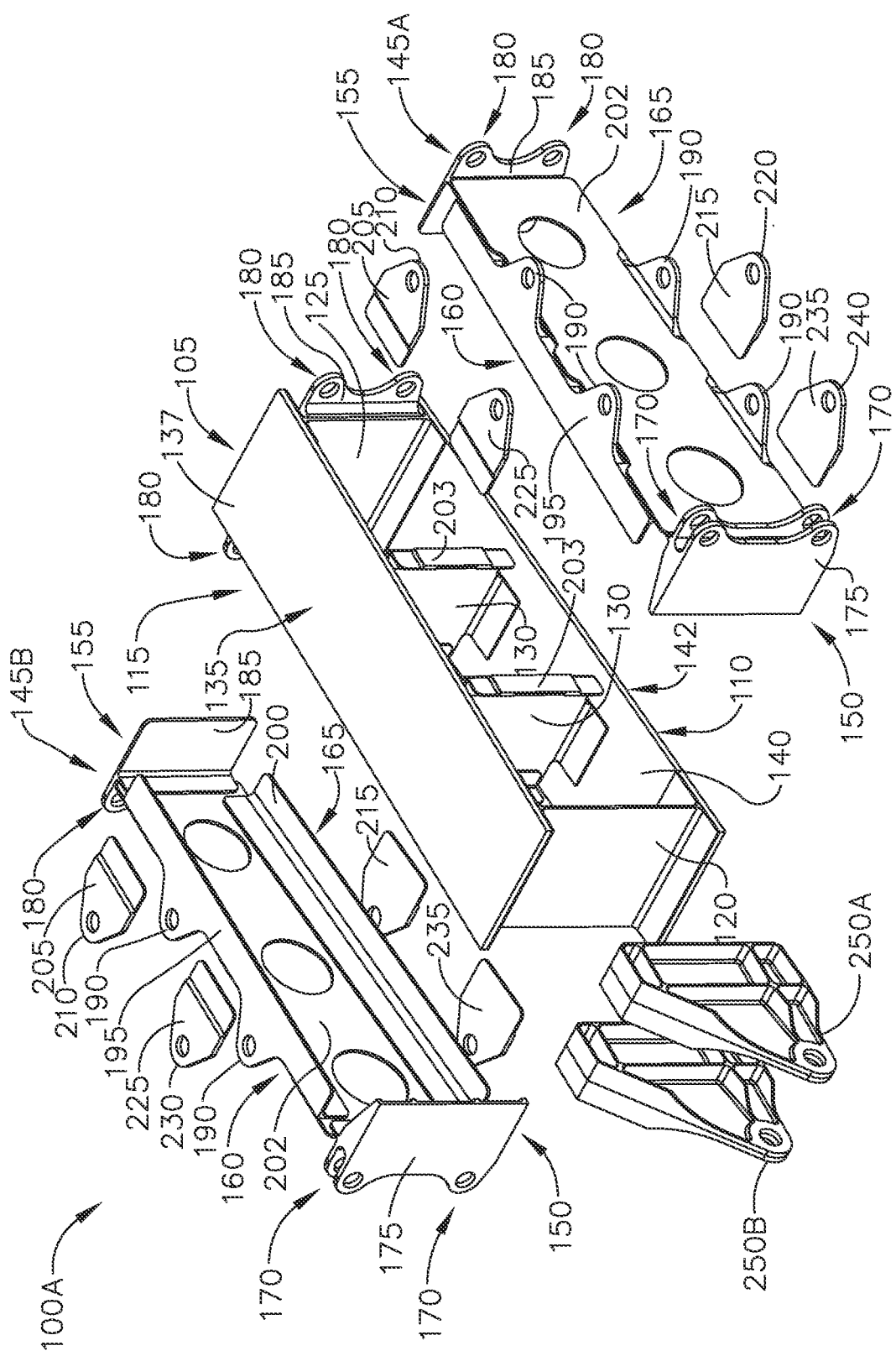
FIG. 6 is an exploded view of the stabilizer connector assembly of FIG. 3.
Figure 7:
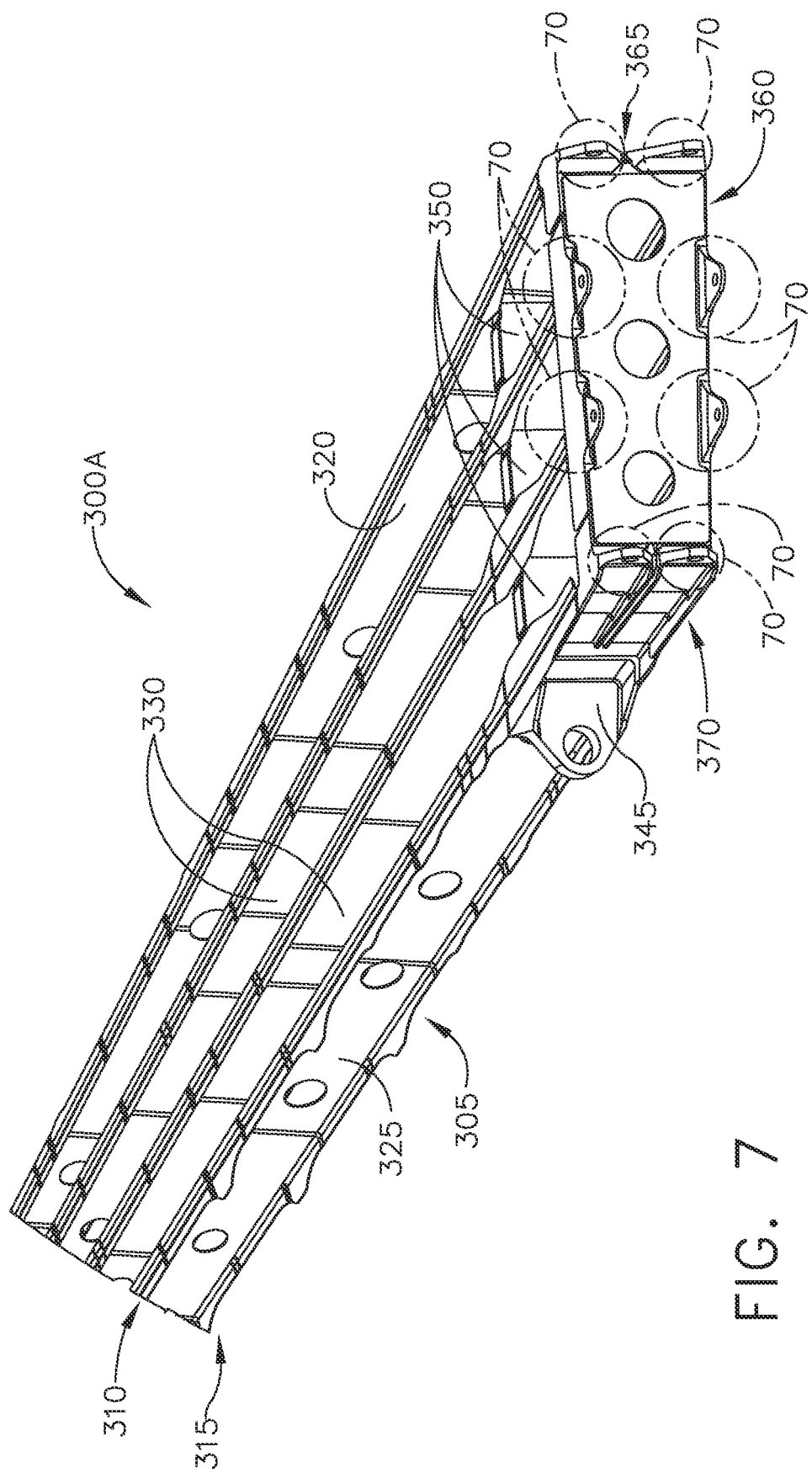
FIG. 7 is a rear perspective view of a first example first horizontal stabilizer with the top skin removed.

First base rib assembly 145A includes at least one pair of aligned front lateral lugs 170 positioned along the front 150 of first base rib assembly 145A and at least one pair of aligned rear lateral lugs 180 positioned along a rear 155 of first base rib assembly 145A. In the example shown, first base rib assembly 145A has two pair of front lateral lugs 170 and two pair of rear lateral lugs 180, however, a single pair or more than two pair of aligned front and/or rear lateral lugs 170, 180 could also be used. Front lateral lugs 170 are part of a front terminal fitting 175 of first base rib assembly 145A, which is secured to a base rib 202, which can be secured to mid spars 130 with L-brackets 203. Front terminal fitting 175 can be a single, unitary part, as shown in FIG. 6, that is secured to front spar 120 or can be two parts, each having one of the pair of aligned front lateral lugs 170, with the parts positioned on opposite sides of front spar 120 and secured to front spar 120. Rear lateral lugs 180 are part of a rear terminal fitting 185 of first base rib assembly 145A, which is secured to base rib 202. Rear terminal fitting 185 can be two parts, each having one of the pair of aligned rear lateral lugs 180, with the parts positioned on opposite sides of rear spar 125, as shown in FIG. 6, or can be a single, unitary part that is secured to rear spar 125. First base rib assembly 145A also includes at least one pair of opposing middle longitudinal lugs 190 disposed between front lateral lugs 170 and rear lateral lugs 180, with one of the pair disposed along a top 160 of first base rib assembly 145A and the other disposed along the bottom 165. In the example shown, first base rib assembly 145A has two pair of opposing middle longitudinal lugs 190, however, a single pair or more than two pair could also be used. One of the pair of middle longitudinal lugs 190 is part of a first side chord 195 positioned along top 160 of first base rib assembly and secured to base rib 202 and the other of the pair is part of a second side chord 200 positioned along bottom 165 and secured to base rib 202. As shown, a single side chord can include multiple middle longitudinal lugs. Alternatively, if more than one pair of middle longitudinal lugs were used, multiple side chords could be used along top 160 and bottom 165, with each side chord having a single middle longitudinal lug. At least one first side plate 205 is adjacent an exterior surface 137 of top skin 135 and is secured to top skin 135 and first side chord 195 of first base rib assembly 145A, for example by threaded members, rivets, etc. First side plate 205 has at least one longitudinal lug 210 that is aligned with and spaced apart from middle longitudinal lug 190 on first side chord 195. Similarly, at least one second side plate 215 is adjacent an exterior surface 142 of bottom skin 140 and is secured to bottom skin 140 and second side chord 200, for example by threaded members, rivets, etc. Second side plate 215 has at least one longitudinal lug 220 that is aligned with and spaced apart from middle longitudinal lug 190 on second side chord 200. If more than one pair of middle longitudinal lugs 190 are used, multiple first and second side plates 205, 215 can be used with each side plate having a single longitudinal lug, as shown. Alternatively, a single side plate could also be used on each side, with each side plate having multiple longitudinal lugs. The pair(s) of front lateral lugs 170, pair(s) of rear lateral lugs 180, and the pair(s) of opposing middle longitudinal lugs 190 of first base rib assembly 145A with the longitudinal lugs 210, 220 of first and second side plates 205, 215 define a plurality of clevises of the first lug and clevis connections 60.

Second base rib assembly 145B is identical to first base rib assembly 145A, except that is it secured to second side 115 of center multi-spar box 105. At least one third side plate 225 is adjacent exterior surface 137 of top skin 135 and is secured to top skin 135 and first side chord 195 of second base rib assembly 145B, for example by threaded members, rivets, etc. Third side plate 225 has at least one longitudinal lug 230 that is aligned with and spaced apart from middle longitudinal lug 190 on first side chord 195. Similarly, at least one fourth side plate 235 is adjacent an exterior surface 142 of bottom skin 140 and is secured to bottom skin 140 and second side chord 200, for example by threaded members, rivets, etc. Fourth side plate 235 has at least one longitudinal lug 240 that is aligned with and spaced apart from middle longitudinal lug 190 on second side chord 200. If more than one pair of middle longitudinal lugs 190 are used, multiple third and fourth side plates 225, 235 can be used with each side plate having a single longitudinal lug, as shown. Alternatively, a single side plate could also be used on each side, with each side plate having multiple longitudinal lugs. The pair(s) of front lateral lugs 170, pair(s) of rear lateral lugs 180, and the pair(s) of opposing middle longitudinal lugs 190 of second base rib assembly 145B with the longitudinal lugs 230, 240 of third and fourth side plates 225, 235 define a plurality of clevises of the second lug and clevis connections 75.

Referring to FIGS. 7-10, a first example first horizontal stabilizer 300A and first example second horizontal stabilizer 500A are shown that can be used in horizontal stabilizer assembly 50 in FIG. 2 and used with stabilizer connector assembly 100A.

First horizontal stabilizer 300A generally includes first multi-spar box 305 and third base rib assembly 360 secured to first multi-spar box 305. First multi-spar box 305 of first horizontal stabilizer 300A includes a front spar 320, a rear spar 325, and at least one mid spar 330 positioned between and spaced apart from front spar 320 and rear spar 325. In the example shown, first horizontal stabilizer 300A has two mid spars 330, but any number of mid spars could be used depending on the particular design. A top skin 335 extends between front spar 320 and rear spar 325 along a top side 310 of first multi-spar box 305 and a bottom skin 340 extends between front spar 320 and rear spar 325 along a bottom side 315 of first multi-spar box 305, opposite top side 310. A first pivot joint 345 is secured to rear spar 325 and a first plurality of riblets 350 are secured between each of the spars 320, 325, 330. First riblets 350 are longitudinally aligned with each other and with first pivot joint 345 and are positioned between and secured to front spar 320 and mid spar 330, mid spars 330 if more than one is used, and mid spar 330 and rear spar 325.

Third base rib assembly 360 is secured to first multi-spar box 305 and includes at least one front lateral lug 385 positioned along a front 365 of third base rib assembly 360, at least one rear lateral lug 395 positioned along a rear 370 of third base rib assembly 360, and at least one pair of opposing middle longitudinal lugs 405 disposed with one of the pair along a top 375 and the other along a bottom 380 of third base rib assembly 360 and between front and rear lateral lugs 385, 395. In the example shown, third base rib assembly 360 has two front lateral lugs 385, two rear lateral lugs 395, and two pairs of middle longitudinal lugs 405 to align with front lateral lugs 170, rear lateral lugs 180, and middle longitudinal lugs 190 of second base rib assembly 145B. However, third base rib assembly 360 can have any number of front lateral lugs 385, rear lateral lugs 395, and pairs of middle longitudinal lugs 405 as needed depending on the configuration of second base rib assembly 145B.

Figure 8:
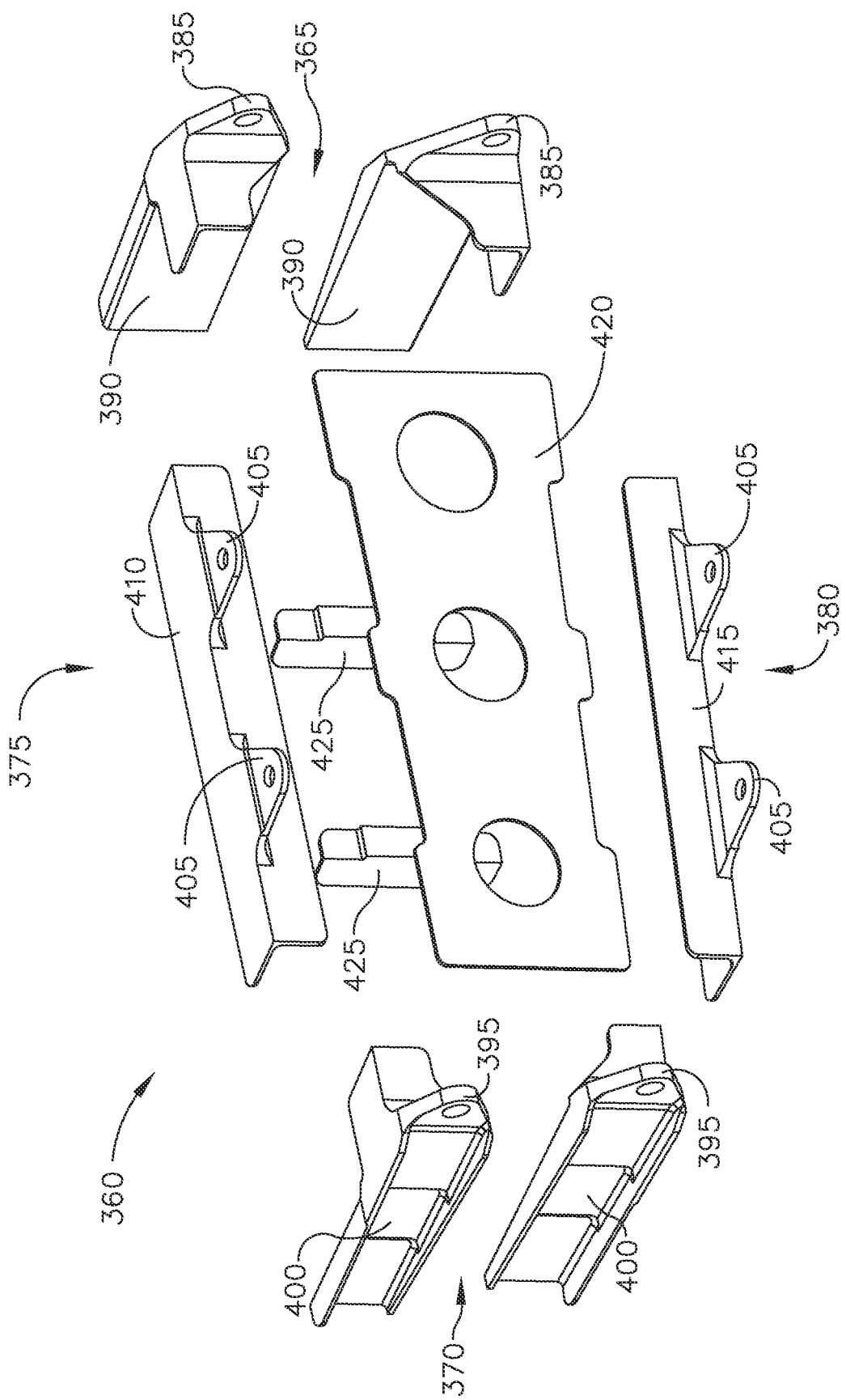
FIG. 8 is an exploded view of the base rib assembly of the first horizontal stabilizer of FIG. 7.
Figure 9:
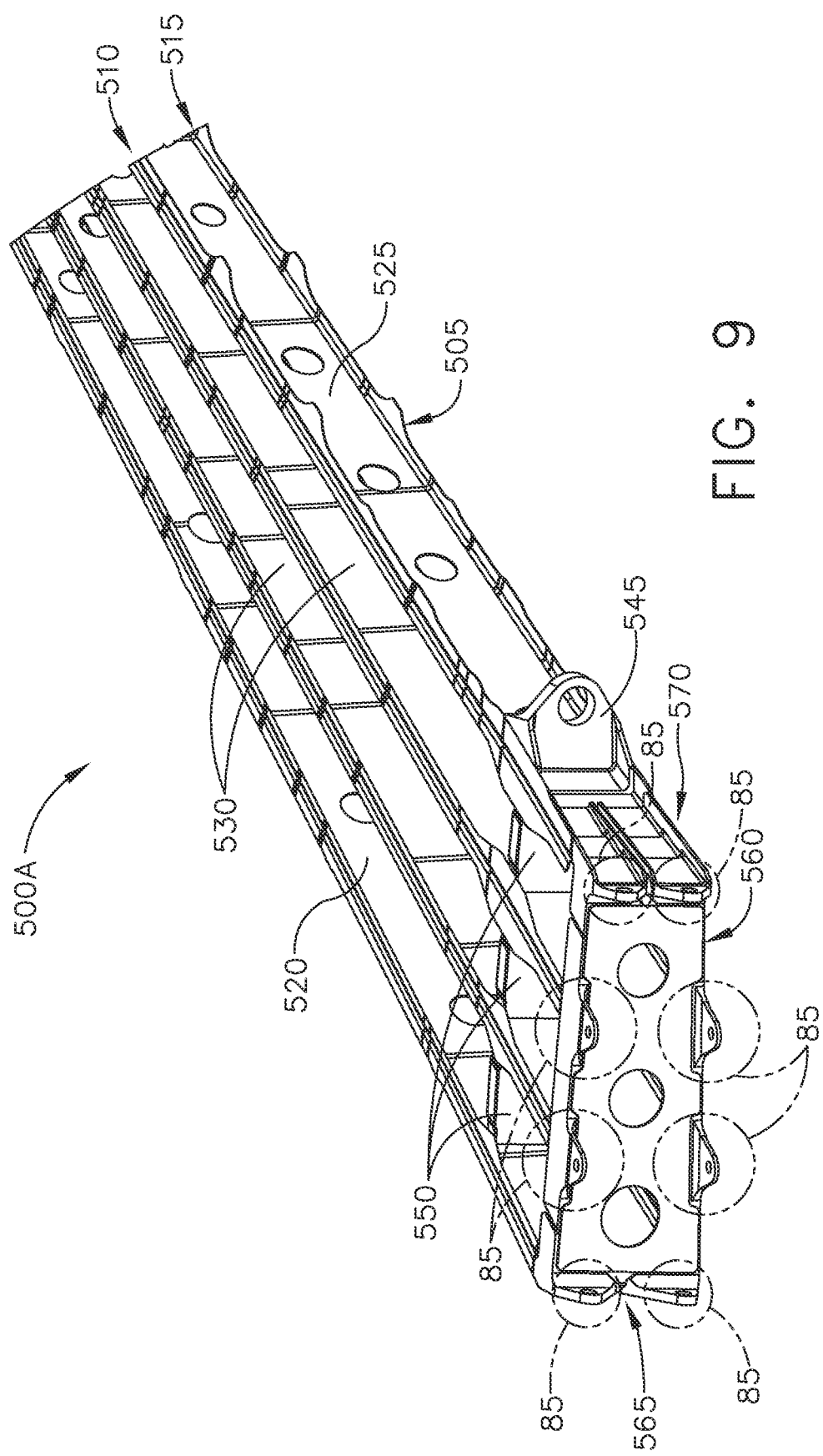
FIG. 9 is rear perspective view of a first example second horizontal stabilizer with the top skin removed.

Front lateral lugs 385 are part of a front terminal fitting 390 of third base rib assembly 360, which is secured to a base rib 420, which can be secured to mid spars 330 with L-brackets 425. Front terminal fitting 390 can be two parts, each having one front lateral lug 385 and secured to front spar 320, as shown in FIG. 8, or front terminal fitting 390 can be a single, unitary part having multiple front lateral lugs 385 that is secured to front spar 320. Rear lateral lugs 395 are part of a rear terminal fitting 400 of third base rib assembly 360, which is secured to base rib 420. As with front terminal fitting 390, rear terminal fitting 400 can be two parts, each having one rear lateral lug 395 and secured to rear spar 325, as shown in FIG. 8, or rear terminal fitting 400 can be a single, unitary part having multiple rear lateral lugs 395 that is secured to rear spar 325. One of the pair of middle longitudinal lugs 405 is part of a first side chord 410 positioned along top 375 of third base rib assembly and secured to base rib 420 and the other of the pair is part of a second side chard 415 positioned along bottom 380 and secured to base rib 420. As shown, a single side chord can include multiple middle longitudinal lugs. Alternatively, if more than one pair of middle longitudinal lugs were used, multiple side chords could be used along top 375 and bottom 380, with each side chord having a single middle longitudinal lug. Front lateral lug(s) 385, rear lateral lug(s) 395, and opposing middle longitudinal lugs 405 define a plurality of lugs of first lug and clevis connections 60.

Second horizontal stabilizer 500A is a mirror image of first horizontal stabilizer 300A and generally includes second multi-spar box 505 and fourth base rib assembly 560 secured to second multi-spar box 505. Second multi-spar box 505 of second horizontal stabilizer 500A includes a front spar 520, a rear spar 525, and at least one mid spar 530 positioned between and spaced apart from front spar 520 and rear spar 525. In the example shown, second horizontal stabilizer 500A has two mid spars 530, but any number of mid spars could be used depending on the particular design. A top skin 535 extends between front spar 520 and rear spar 525 along a top side 510 of second multi-spar box 505 and a bottom skin 540 extends between front spar 520 and rear spar 525 along a bottom side 515 of second multi-spar box 505, opposite top side 510. A second pivot joint 545 is secured to rear spar 525 and a second plurality of riblets 550 are secured between each of the spars 520, 525, 630. Second riblets 550 are longitudinally aligned with each other and with second pivot joint 545 and are positioned between and secured to front spar 520 and mid spar 530, mid spars 530 if more than one is used, and mid spar 530 and rear spar 525.

Fourth base rib assembly 560 is secured to second multi-spar box 505 and includes at least one front lateral lug 585 positioned along a front 565 of fourth base rib assembly 560, at least one rear lateral lug 595 positioned along a rear 570 of fourth base rib assembly 560, and at least one pair of opposing middle longitudinal lugs 605 disposed with one of the pair along a top 575 and the other along a bottom 580 of fourth base rib assembly 560 and between front and rear lateral lugs 585, 595. In the example shown, fourth base rib assembly 560 has two front lateral lugs 585, two rear lateral lugs 595, and two pairs of middle longitudinal lugs 605 to align with front lateral lugs 170, rear lateral lugs 180, and middle longitudinal lugs 190 of first base rib assembly 145A. However, fourth base rib assembly 560 can have any number of front lateral lugs 585, rear lateral lugs 595, and pairs of middle longitudinal lugs 605 as needed depending on the configuration of first base rib assembly 145A.

Figure 10:
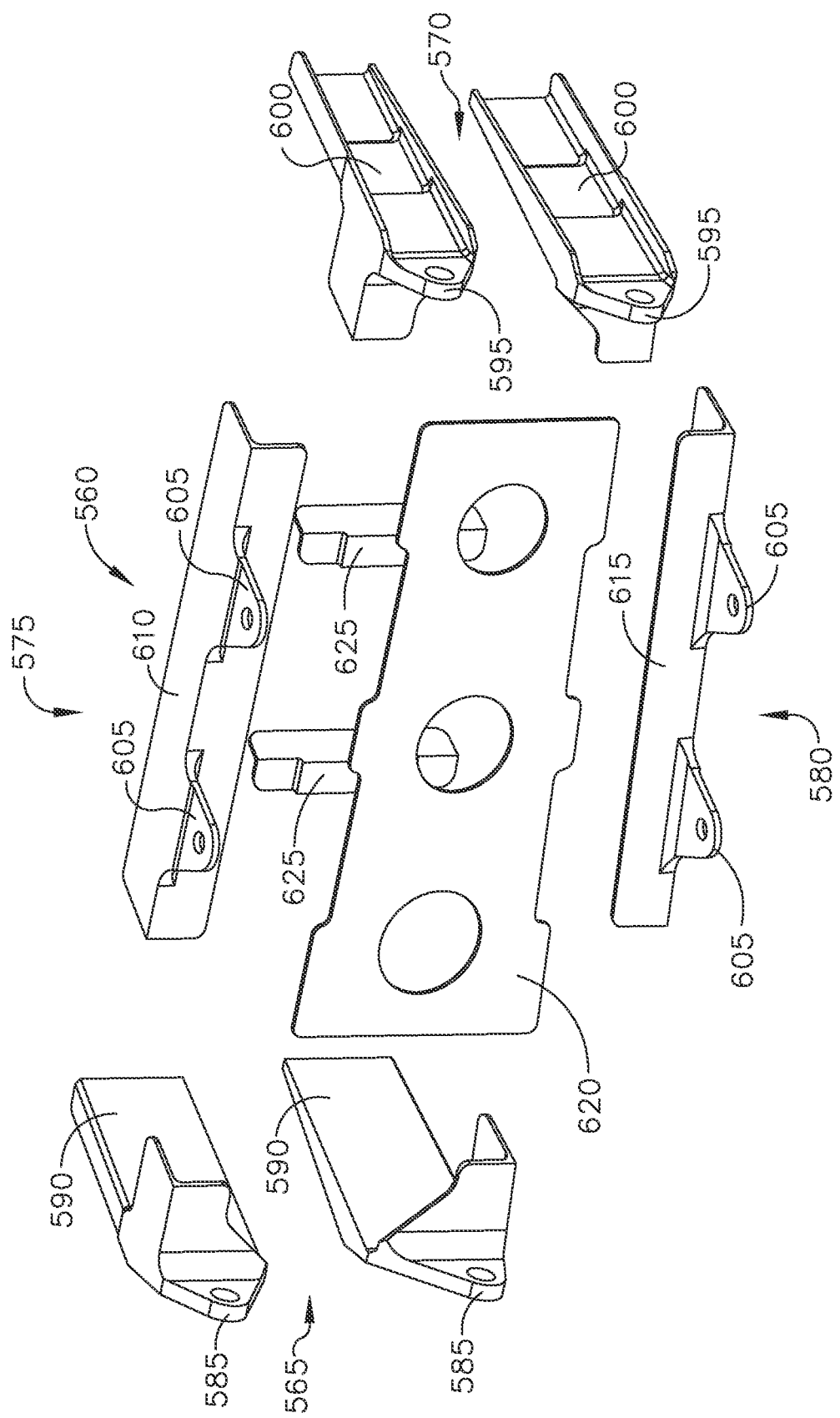
FIG. 10 is an exploded view of the base rib assembly of the second horizontal stabilizer of FIG. 9.
Figure 11:
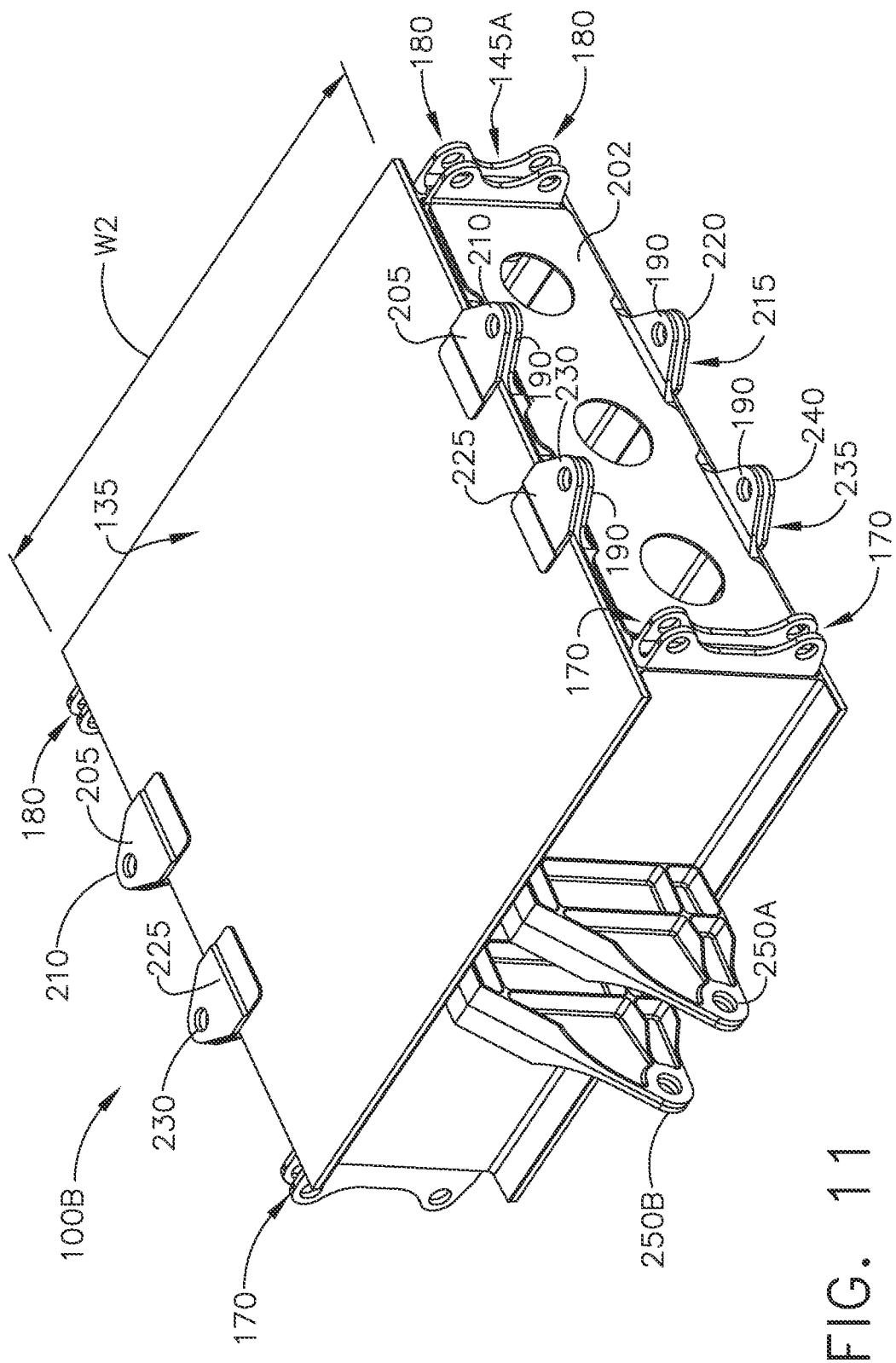
FIG. 11 is a front, right perspective view of a second example stabilizer connector assembly of the horizontal stabilizer assembly of FIG. 2.
Figure 12:
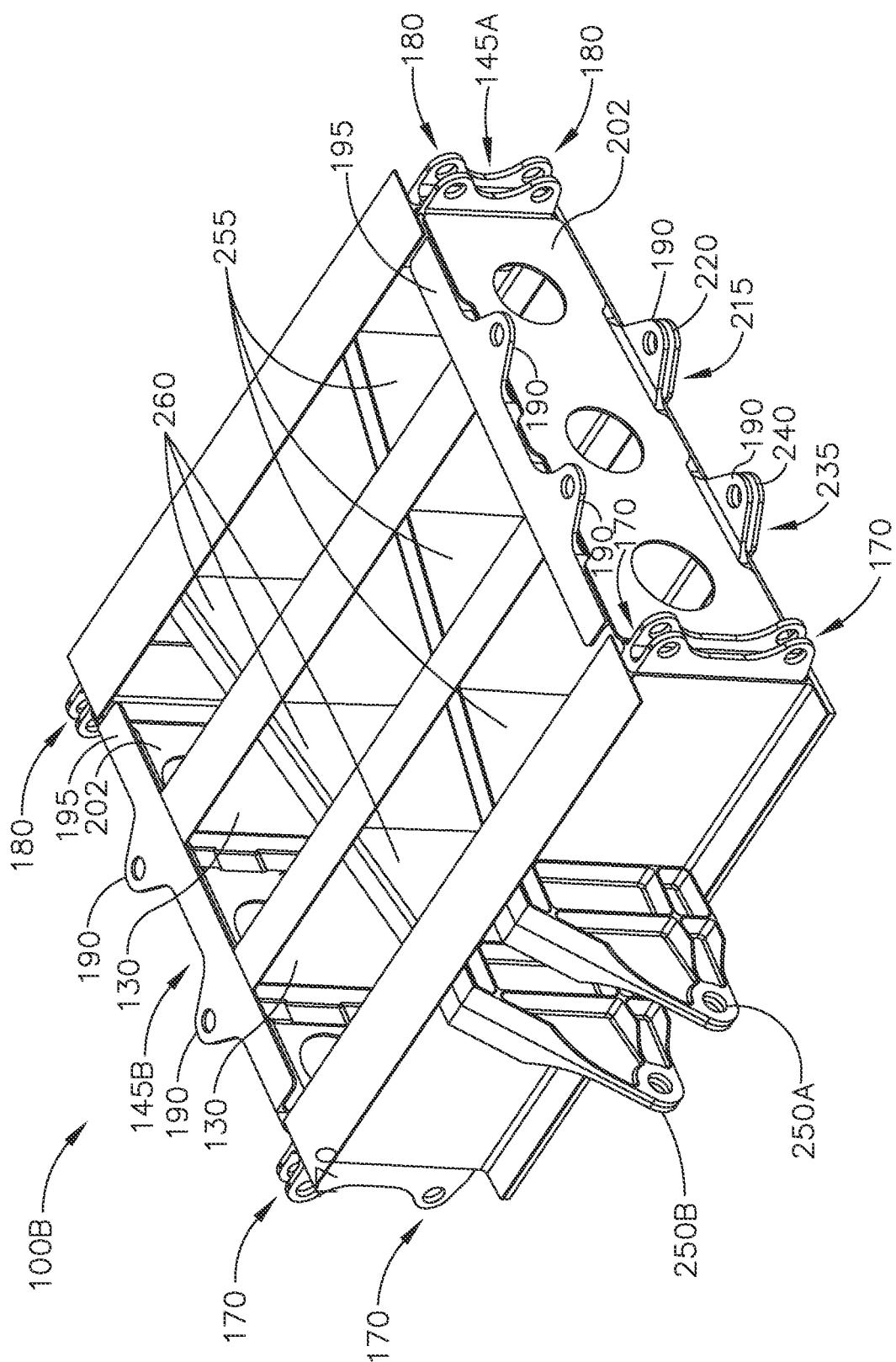
FIG. 12 is a front, right perspective view of the stabilizer connector assembly of FIG. 11 with the top skin removed.
Figure 13:
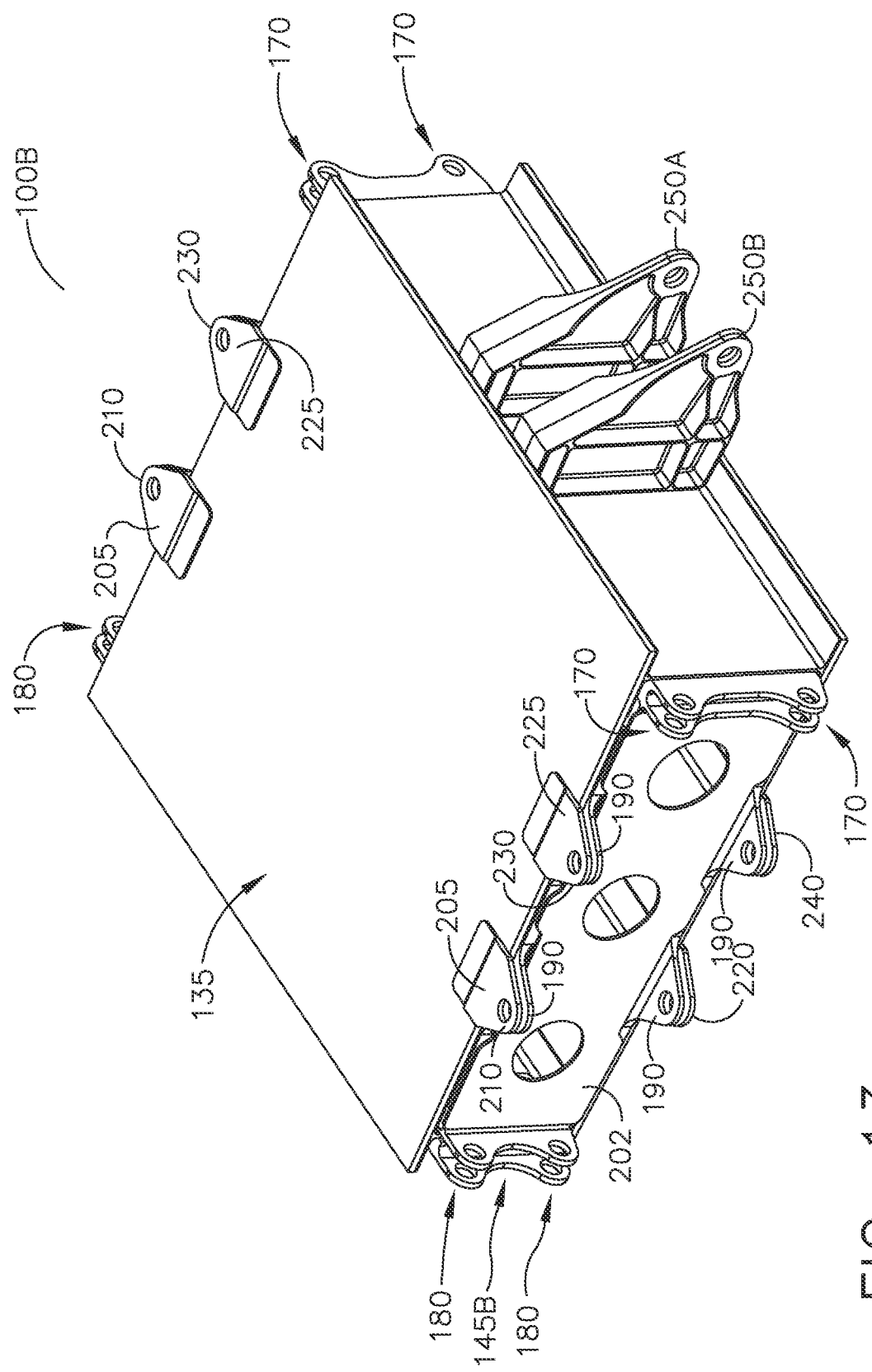
FIG. 13 is a front, left perspective view of the stabilizer connector assembly of FIG. 11.
Figure 14:
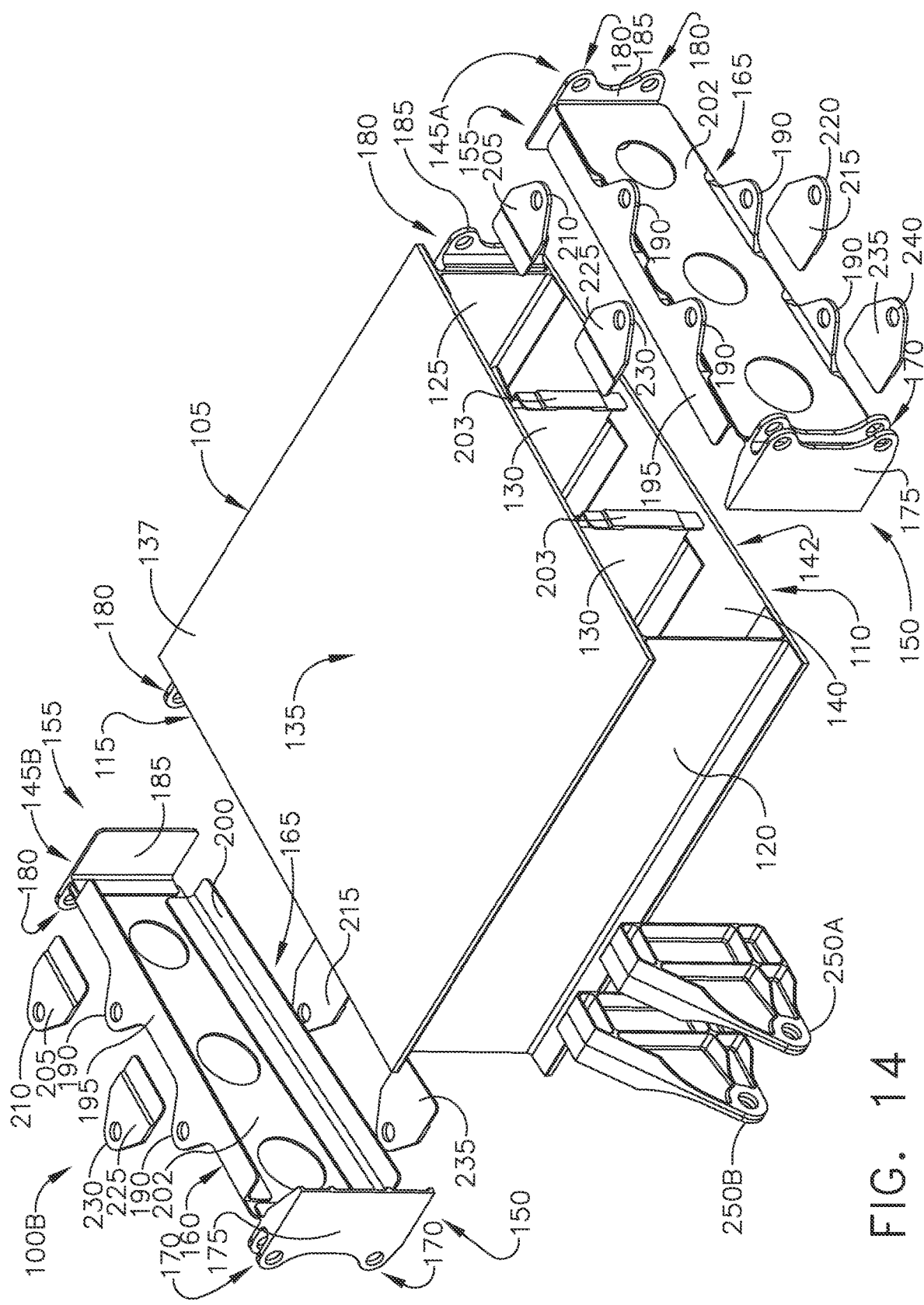
FIG. 14 is an exploded view of the stabilizer connector assembly of FIG. 11.
Figure 15:
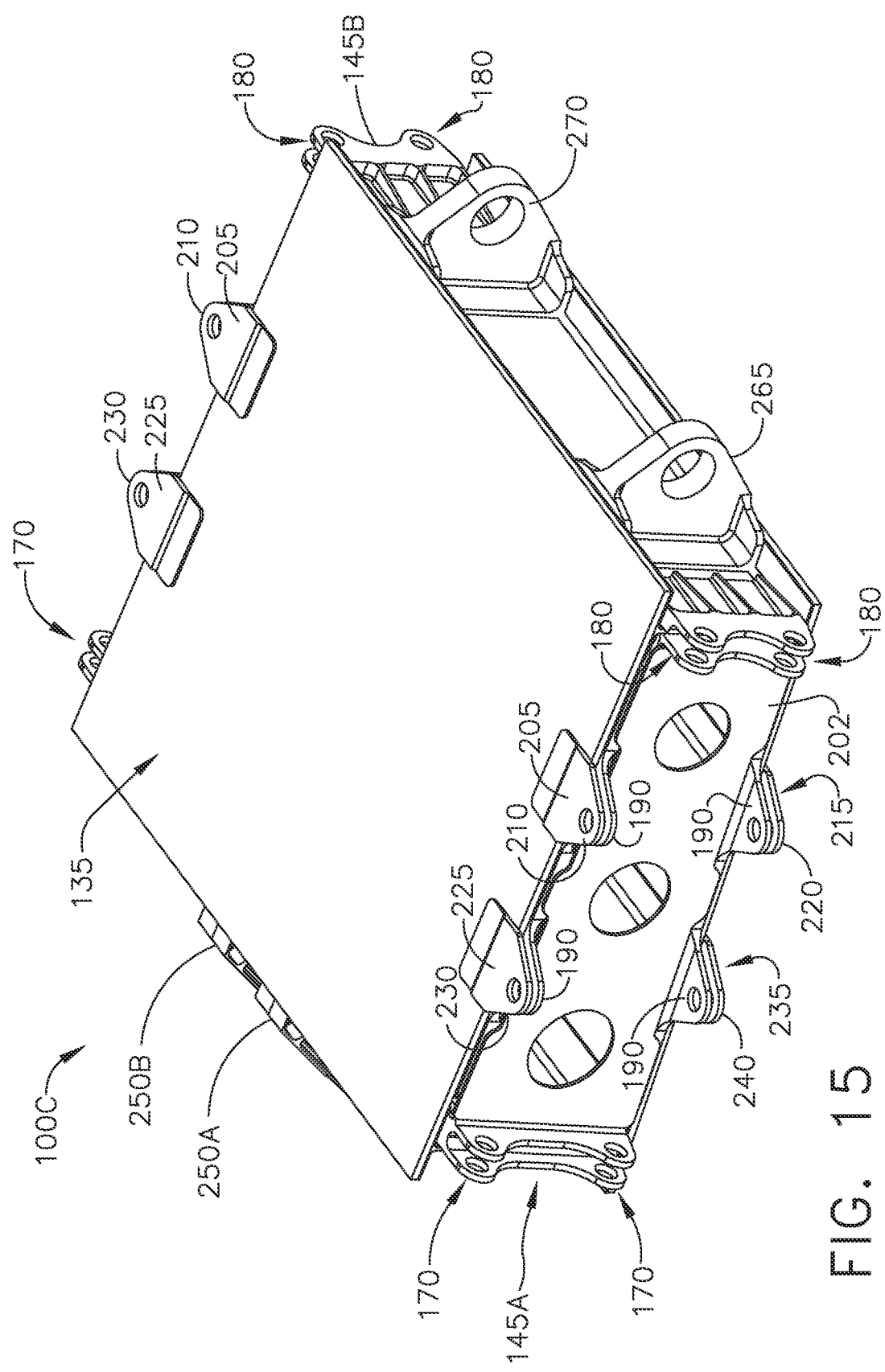
FIG. 15 is rear, right perspective view of a third example stabilizer connector assembly of the horizontal stabilizer assembly of FIG. 2.
Figure 16:
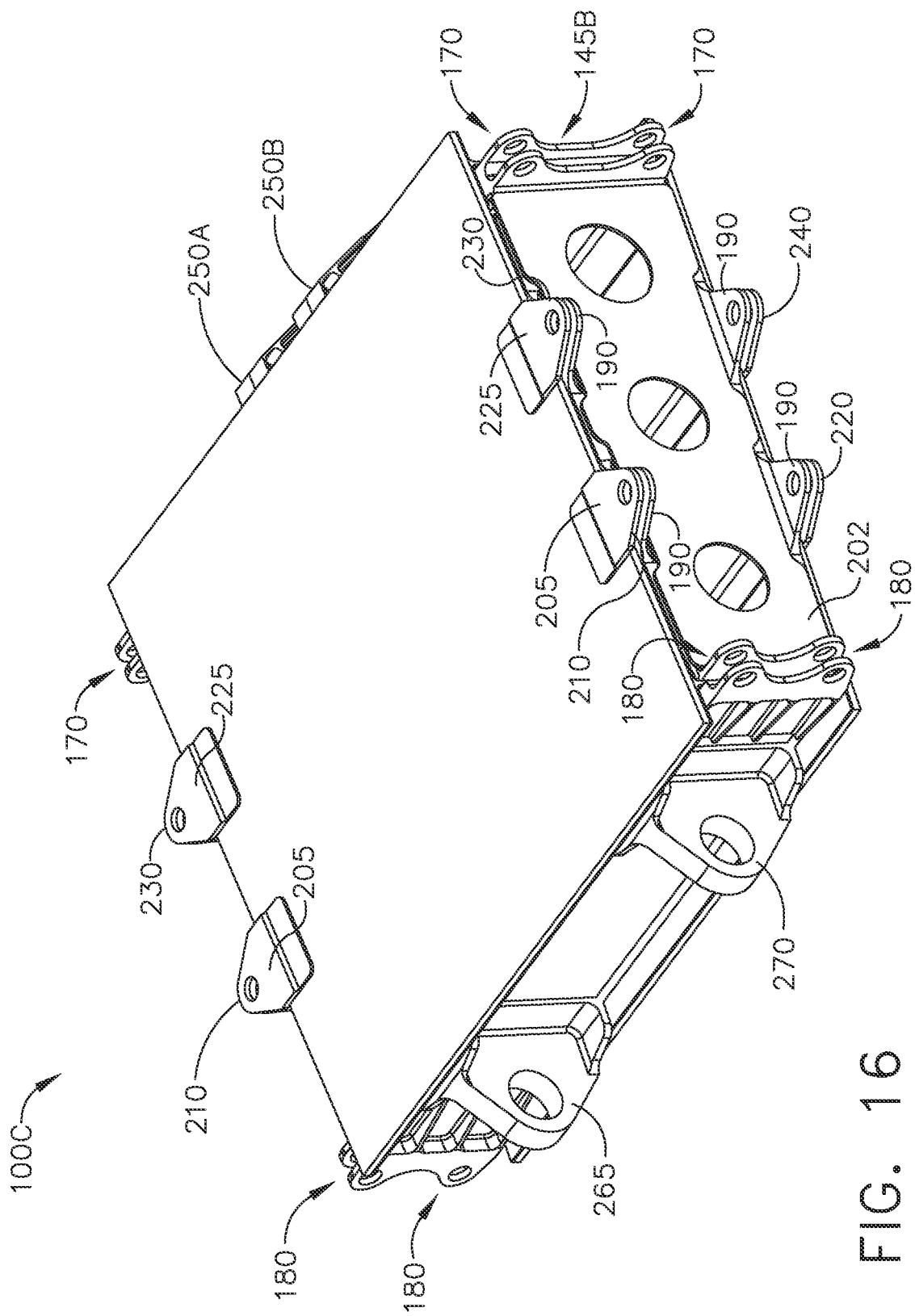
FIG. 16 is a rear, left perspective view of the stabilizer connector assembly of FIG. 15.
Figure 17:
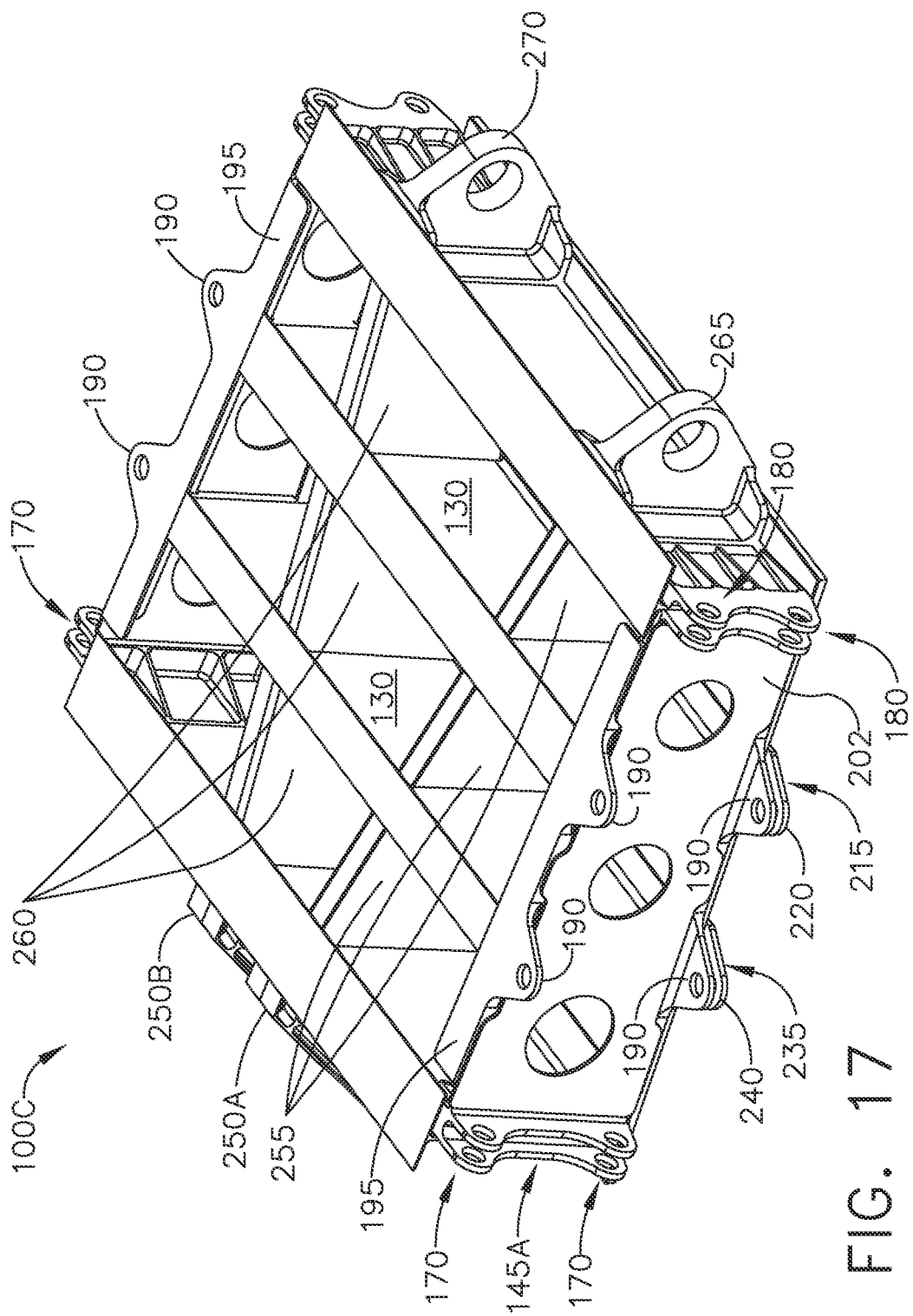
FIG. 17 is a rear, right perspective view of the stabilizer connector assembly of FIG. 15 with the top skin removed.
Figure 18:
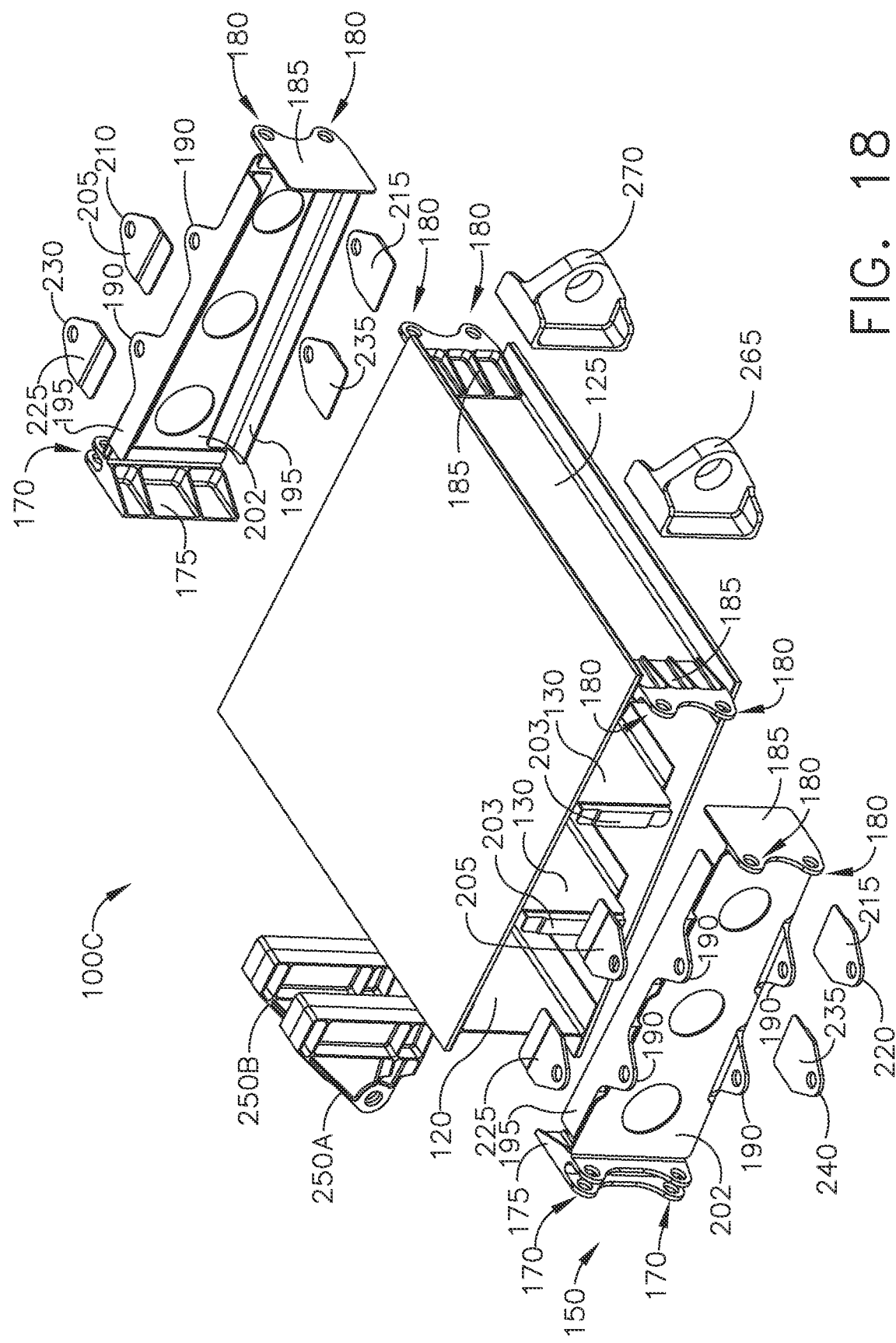
FIG. 18 is an exploded view of the stabilizer connector assembly of FIG. 15.

Front lateral lugs 585 are part of a front terminal fitting 590 of fourth base rib assembly 560, which is secured to a base rib 620, which can be secured to mid spars 530 with L-brackets 625. Front terminal fitting 590 can be two parts, each having one front lateral lug 585 and secured to front spar 520, as shown in FIG. 10, or front terminal fitting 590 can be a single, unitary part having multiple front lateral lugs 585 that is secured to front spar 520. Rear lateral lugs 595 are part of a rear terminal fitting 600 of fourth base rib assembly 560, which is secured to base rib 620. As with front terminal fitting 590, rear terminal fitting 600 can be two parts, each having one rear lateral lug 595 and secured to rear spar 525, as shown in FIG. 10, or rear terminal fitting 600 can be a single, unitary part having multiple rear lateral lugs 595 that is secured to rear spar 525. One of the pair of middle longitudinal lugs 605 is part of a first side chord 610 positioned along top 575 of fourth base rib assembly 560 and secured to base rib 620 and the other of the pair is part of a second side chord 615 positioned along bottom 580 and secured to base rib 620. As shown, a single side chord can include multiple middle longitudinal lugs. Alternatively, if more than one pair of middle longitudinal lugs were used, multiple side chords could be used along top 575 and bottom 580, with each side chord having a single middle longitudinal lug. Front lateral lug(s) 585, rear lateral lug(s) 595, and opposing middle longitudinal lugs 605 define a plurality of lugs of second lug and clevis connections 75.

Referring to FIGS. 11-14, a second example stabilizer connector assembly 1006 is shown that can be used with horizontal stabilizer assembly 50 in FIG. 2 and used with first and second horizontal stabilizers 300A, 500A. Stabilizer connector assembly 100B is identical to stabilizer connector assembly 100A, except that a width W2 of stabilizer connector assembly 100B is greater than a width W1 of stabilizer connector assembly 100A. To provide additional support, stabilizer connector assembly 100B also has third and fourth plurality of riblets 255, 260 secured between each of the spars 120, 125, 130. Third riblets 255 are longitudinally aligned with each other and with first trim actuator fitting 250A and are positioned between and secured to front spar 120 and mid spar 130, mid spars 130 if more than one is used, and mid spar 130 and rear spar 125. Fourth riblets 260 are longitudinally aligned with each other and with second trim actuator fitting 250B and are positioned between and secured to front spar 120 and mid spar 130, mid spars 130 if more than one is used, and mid spar 130 and rear spar 125.

Referring to FIGS. 15-18, a third example stabilizer connector assembly 100C is shown that can be used with horizontal stabilizer assembly 50 in FIG. 2. Stabilizer connector assembly 100C is identical to stabilizer connector assembly 100B, except that stabilizer connector assembly 100C has first and second pivot joints 265, 270 secured to rear spar 125. In stabilizer connector assembly 100C, third riblets 255 are longitudinally aligned with each other and with first trim actuator fitting 250A and first pivot joint 265 and are positioned between and secured to front spar 120 and mid spar 130, mid spars 130 if more than one is used, and mid spar 130 and rear spar 125. Fourth riblets 260 are longitudinally aligned with each other and with second trim actuator fitting 250B and second pivot joint 270 and are positioned between and secured to front spar 120 and mid spar 130, mid spars 130 if more than one is used, and mid spar 130 and rear spar 125.

Figure 19:
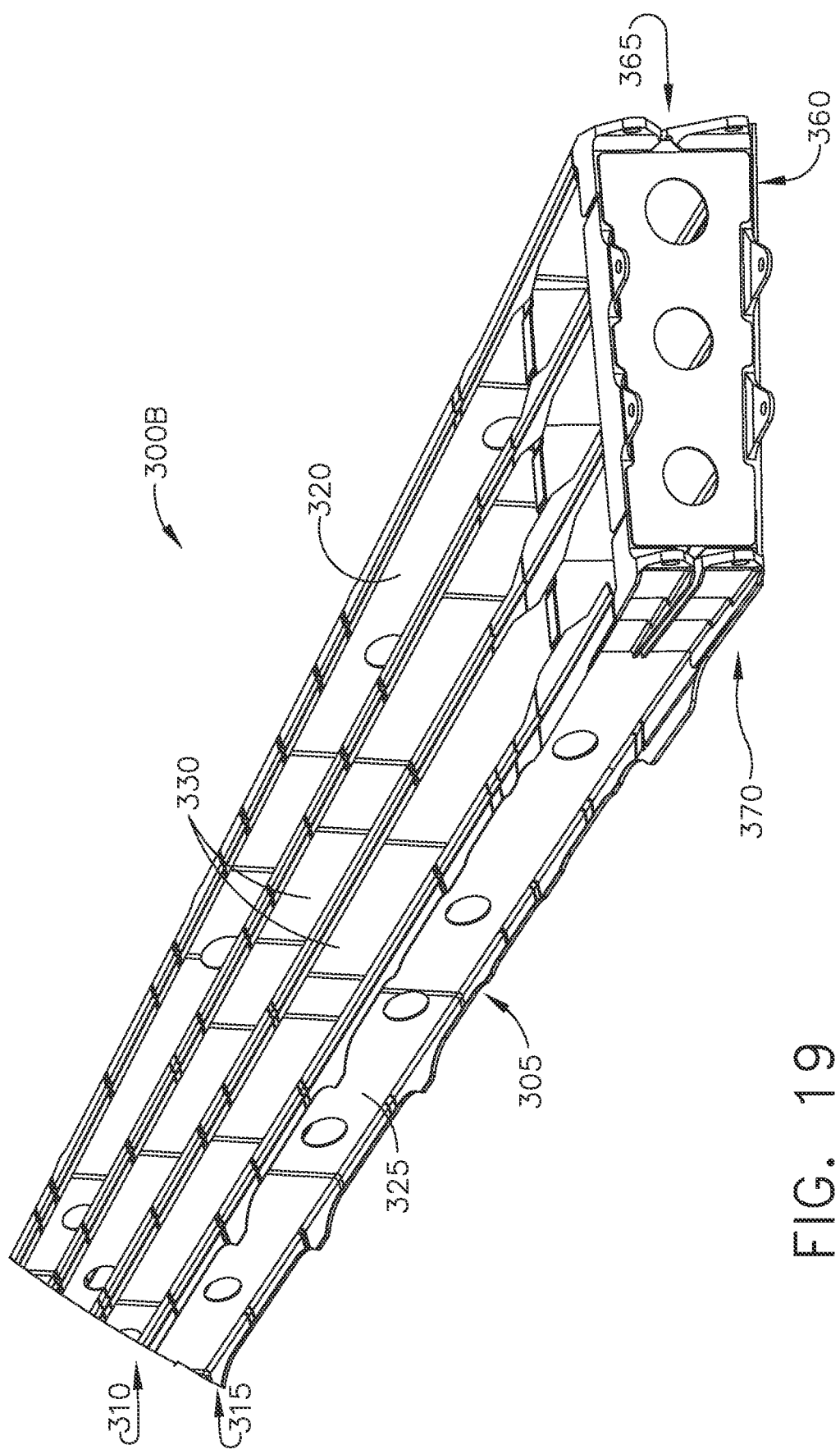
FIG. 19 is a rear perspective view of a second example first horizontal stabilizer with the top skin removed.
Figure 20:
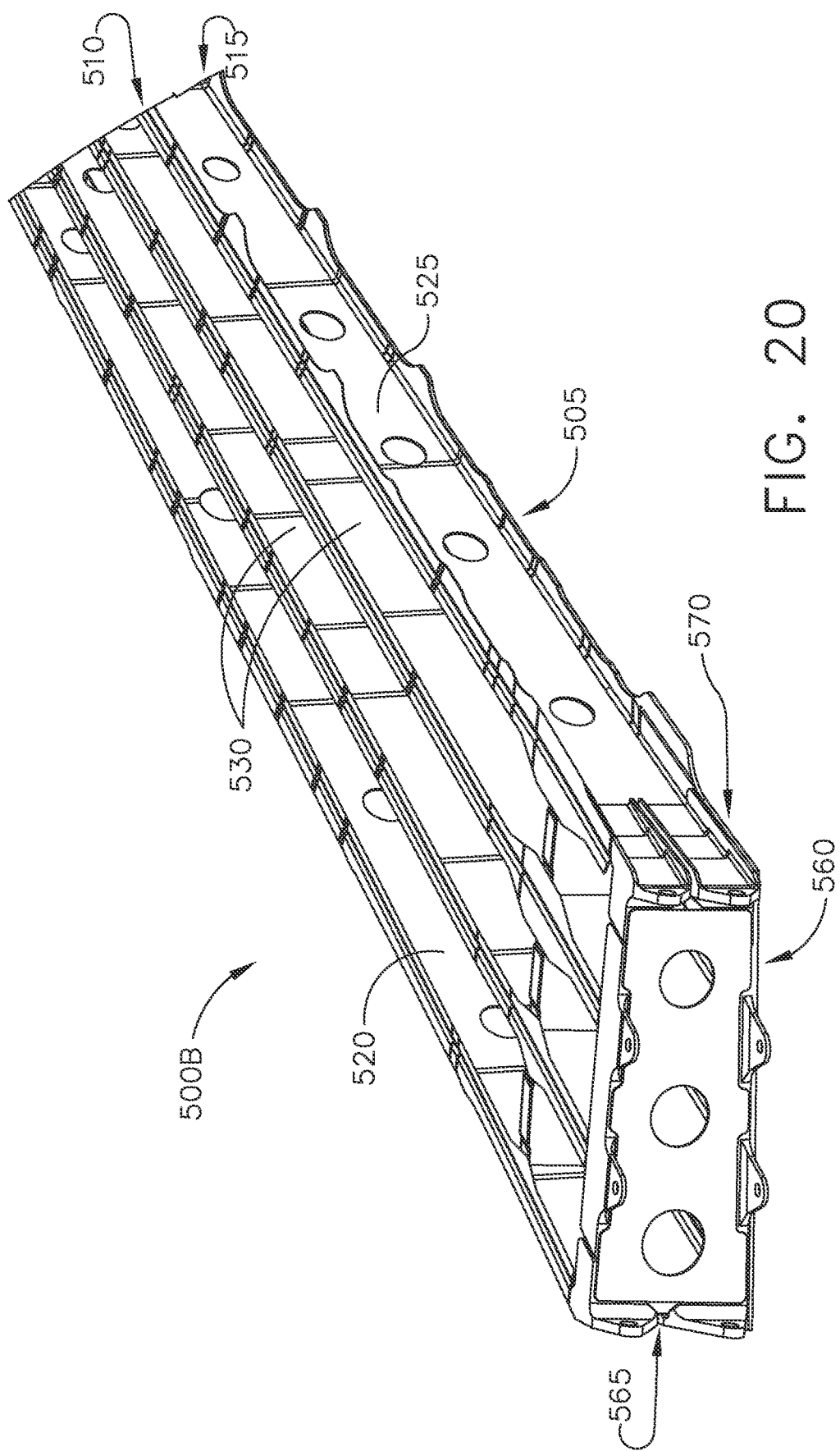
FIG. 20 is rear perspective view of a second example second horizontal stabilizer with the top skin removed.

Referring to FIGS. 19-20, a second example first horizontal stabilizer 300B and second example second horizontal stabilizer 500B are shown that can be used in horizontal stabilizer assembly 50 in FIG. 2 and used with stabilizer connector assembly 100C. First and second horizontal stabilizers 300B, 500B are identical to first and second horizontal stabilizers 300A, 500A, except that first and second horizontal stabilizers 300B, 500B do not have any pivot joints.

To assemble horizontal stabilizer assembly 50 for aircraft 10, stabilizer connector assembly 100, 100A, 100B, 100C, first horizontal stabilizer 300, 300A, 300B, and second horizontal stabilizer 500, 500A, 500B are individually assembled.

To assemble stabilizer connector assembly 100, 100A, 100B, 100C, first and second base rib assemblies 145A, 145B are assembled by attaching first and second side chords 195, 200, front terminal fitting 175, and rear terminal fitting 185 to base rib 202. First base rib assembly 145A is then positioned adjacent first side 110 of center multi-spar box 105 and second base rib assembly 145B is positioned adjacent second side 115 of center multi-spar box 105, opposite first side 110. First side plate 205 and third side plate 225 are positioned adjacent exterior surface 137 of top skin 135 of center multi-spar box 105 and are secured to top skin 135 and to first and second base rib assemblies 145A, 145B, respectively, for example, by threaded members, rivets, etc., such that longitudinal lugs 210, 230 of first side plate 205 and third side plate 225 are aligned with and spaced apart from corresponding middle longitudinal lugs 190 of first and second base rib assemblies 145A, 145B. Second side plate 215 and fourth side plate 235 are also positioned adjacent exterior surface 142 of bottom skin 140 of center multi-spar box 105 and are secured to bottom skin 140 and to first and second base rib assemblies 145A, 145B, respectively, for example, by threaded members, rivets, etc., such that longitudinal lugs 220, 240 of second side plate 215 and fourth side plate 235 are aligned with and spaced apart from corresponding middle longitudinal lugs 190 of first and second base rib assemblies 145A, 145B. First and second trim actuator fittings 250A, 250B are also secured to front spar 120 of center multi-spar box 105.

When assembling stabilizer connector assembly 100B, third and fourth plurality of riblets 255, 260 are also secured between each spar 120, 125, 130 of center multi-spar box 105, for example, by threaded members, rivets, welding, etc. Similarly, when assembling stabilizer connector assembly 100C, first and second pivot joints 265, 270 are secured to rear spar 125, for example by threaded members, rivets, welding, etc., and third and fourth plurality of riblets 255, 260 are also secured between each spar 120, 125, 130 of center multi-spar box 105, for example, by threaded members, rivets, welding, etc.

To assemble first and second horizontal stabilizers 300, 300A, 300B, 500, 500A, 500B, third and fourth base rib assemblies 360, 560 are assembled by attaching first and second side chords 410, 415, 610, 615, front terminal fittings 390, 590, and rear terminal fittings 400, 600 to corresponding base ribs 420, 620. Third base rib assembly 360 is positioned adjacent first multi-spar box 305 of first horizontal stabilizer 300, 300A, 300B and is secured to first multi-spar box 305, for example, by threaded members, rivets, welding, etc. Similarly, fourth base rib assembly 560 is positioned adjacent second multi-spar box 505 of second horizontal stabilizer 500, 500A, 500B and is secured to second multi-spar box 505, for example, by threaded members, rivets, welding, etc.

When assembling first horizontal stabilizer 300A, first pivot joint 345 is also secured to rear spar 325 of first multi-spar box 305 and first riblets 350 are secured between each spar 320, 325, 330 of first multi-spar box 305. Similarly, when assembling second horizontal stabilizer 500A, second pivot joint 545 is secured to rear spar 525 of second multi-spar box 505 and second riblets 550 are secured between each spar 520, 525, 530 of second multi-spar box.

Once individually assembled, first horizontal stabilizer 300, 300A, 300B is positioned adjacent first side 110 of center multi-spar box 105 and second horizontal stabilizer 500, 500A, 500B is positioned adjacent second side 115 of center multi-spar box 105.

Retaining members 90 are then inserted through mounting holes in corresponding lugs in first and third base rib assemblies 145A, 360 and through mounting holes in corresponding lugs in second and fourth base rib assemblies 145B, 560 to secure first and second horizontal stabilizers 300, 300A, 300B, 500, 500A, 500B to stabilizer connector assembly 100, 100A, 100B.

While various examples have been described above, this disclosure is not intended to be limited thereto. Variations can be made to the disclosed examples that are still within the scope of the appended claims.

What is claimed:

1. A horizontal stabilizer assembly, comprising:
   a stabilizer connector assembly having a center multi-spar box including a front spar, a rear spar, at least one mid spar positioned between and spaced apart from the front spar and the rear spar;
   a first horizontal stabilizer having a first multi-spar box connected to a first side of the center multi-spar box with a plurality of first lug and clevis connections;
   a second horizontal stabilizer having a second multi-spar box connected to a second side of the center multi-spar box, opposite the first side, with a plurality of second lug and clevis connections; and
   wherein each of the front spar, the rear spar, and the at least one mid spar of the center multi-spar box extend between the first lug and clevis connections and the second lug and clevis connections;
   wherein the at least one mid spar of the center multi-spar box aligns with a respective one of the first lug and clevis connections and a respective one of the second lug and clevis connections.

2. The horizontal stabilizer assembly of claim 1, wherein:
the plurality of first lug and clevis connections include a plurality of pairs of aligned lugs extending from the first side of the center multi-spar box and defining clevises, a plurality of lugs extending from the first multi-spar box of the first horizontal stabilizer and corresponding to the pairs of aligned lugs of the first side of the center multi-spar box, and retaining members inserted through the pairs of aligned lugs of the first side of the center multi-spar box and the corresponding lugs of the first multi-spar box; and
the plurality of second lug and clevis connections include a plurality of pairs of aligned lugs extending from the second side of the center multi-spar box and defining devises, a plurality of lugs extending from the second multi-spar box of the second horizontal stabilizer and corresponding to the pairs of aligned lugs of the second side of the center multi-spar box, and retaining members inserted through the pairs of aligned lugs of the second side of the center multi-spar box and the corresponding lugs of the second multi-spar box.

3. The horizontal stabilizer assembly of claim 1, wherein the center multi-spar box comprises a top skin extending between the front spar and the rear spar, and a bottom skin disposed opposite the top skin and extending between the front spar and the rear spar.

4. The horizontal stabilizer assembly of claim 3, wherein the stabilizer connector assembly comprises:
a first base rib assembly secured to the first side of the center multi-spar box, the first base rib assembly including a pair of aligned front lateral lugs positioned along a front of the first base rib assembly, a pair of aligned rear lateral lugs positioned along a rear of the first base rib assembly, at least one pair of opposing middle longitudinal lugs disposed along a top of the first base rib assembly and a bottom of the first base rib assembly and between the front lateral lugs and the rear lateral lugs;
a first side plate adjacent an exterior surface of the top skin and secured to the top skin and the first base rib assembly, the first side plate having at least one longitudinal lug aligned with and spaced apart from one of the pair of opposing middle longitudinal lugs of the first base rib assembly and a second side plate adjacent an exterior surface of the bottom skin and secured to the bottom skin and the first base rib assembly, the second side plate having at least one longitudinal lug aligned with and spaced apart from the other of the pair of opposing middle longitudinal lugs of the first base rib assembly, wherein the pair of front lateral lugs, the pair of rear lateral lugs, and the pair of opposing middle longitudinal lugs with the first and second side plates define a plurality of clevises of the first lug and clevis connections;
a second base rib assembly secured to the second side of the center multi-spar box, the second base rib assembly including a pair of aligned front lateral lugs positioned along a front of the second base rib assembly, a pair of aligned rear lateral lugs positioned along a rear of the second base rib assembly, at least one pair of opposing middle longitudinal lugs disposed along a top of the second base rib assembly and a bottom of the second base rib assembly and between the front lateral lugs and the rear lateral lugs; and
a third side plate adjacent an exterior surface of the top skin and secured to the top skin and the second base rib assembly, the third side plate having at least one longitudinal lug aligned with and spaced apart from one of the pair of opposing middle longitudinal lugs of the second base rib assembly and a fourth side plate adjacent an exterior surface of the bottom skin and secured to the bottom skin and the second base rib assembly, the fourth side plate having at least one longitudinal lug aligned with and spaced apart from the other of the pair of opposing middle longitudinal lugs of the second base rib assembly, wherein the pair of front lateral lugs, the pair of rear lateral lugs, and the pair of opposing middle longitudinal lugs with the first and second side plates define a plurality of devises of the second lug and clevis connections.

5. The horizontal stabilizer assembly of claim 4, wherein:
the first horizontal stabilizer comprises a third base rib assembly secured to the first multi-spar box, the third base rib assembly including a front lateral lug positioned along a front of the third base rib assembly, a rear lateral lug positioned along a rear of the third base rib assembly, at least one pair of opposing middle longitudinal lugs disposed along a top of the third base rib assembly and a bottom of the third base rib assembly and between the front lateral lug and the rear lateral lug, wherein the front lateral lug, the rear lateral lug, and the pair of opposing middle longitudinal lugs define a plurality of lugs of the first lug and clevis connections; and
the second horizontal stabilizer comprises a fourth base rib assembly secured to the second multi-spar box, the fourth base rib assembly including a front lateral lug positioned along a front of the fourth base rib assembly, a rear lateral lug positioned along a rear of the fourth base rib assembly, at least one pair of opposing middle longitudinal lugs disposed along a top of the fourth base rib assembly and a bottom of the fourth base rib assembly and between the front lateral lug and the rear lateral lug, wherein the front lateral lug, the rear lateral lug, and the pair of opposing middle longitudinal lugs define a plurality of lugs of the second lug and clevis connections.

6. The horizontal stabilizer assembly of claim 1, wherein:
the first multi-spar box of the first horizontal stabilizer includes a front spar, a rear spar, at least one mid spar positioned between and spaced apart from the front spar and the rear spar, a top skin extending between the front spar and the rear spar, and a bottom skin disposed opposite the top skin and extending between the front spar and the rear spar;
the first horizontal stabilizer includes a first pivot joint secured to the rear spar of the first multi-spar box, and a first plurality of riblets longitudinally aligned between the front, mid, and rear spars of the first multi-spar box and aligned with the first pivot joint;
the second multi-spar box of the second horizontal stabilizer includes a front spar, a rear spar, at least one mid spar positioned between and spaced apart from the front spar and the rear spar, a top skin extending between the front spar and the rear spar, and a bottom skin disposed opposite the top skin and extending between the front spar and the rear spar; and
the second horizontal stabilizer includes a second pivot joint secured to the rear spar of the second multi-spar box, and a second plurality of riblets longitudinally aligned between the front, mid, and rear spars of the second multi-spar box and aligned with the second pivot joint.

7. The horizontal stabilizer assembly of claim 6, wherein:
the center multi-spar box comprises a top skin extending between the front spar and the rear spar, and a bottom skin disposed opposite the top skin and extending between the front spar and the rear spar; and
the stabilizer connector assembly includes first and second trim actuator fittings secured to the front spar of the center multi-spar box, and a third plurality of riblets longitudinally aligned between the front, mid, and rear spars of the center multi-spar box and aligned with the first trim actuator fitting, and a fourth plurality of riblets longitudinally aligned between the front, mid, and rear spars of the center multi-spar box and aligned with the second trim actuator fitting.

8. The horizontal stabilizer assembly of claim 1, wherein:
the center multi-spar box comprises a top skin extending between the front spar and the rear spar, and a bottom skin disposed opposite the top skin and extending between the front spar and the rear spar; and
the stabilizer connector assembly includes first and second trim actuator fittings secured to the front spar of the center multi-spar box, first and second pivot joints secured to the rear spar of the center multi-spar box, a first plurality of riblets longitudinally aligned between the front, mid, and rear spars of the center multi-spar box and aligned with the first trim actuator fitting and the first pivot joint, and a second plurality of riblets longitudinally aligned between the front, mid, and rear spars of the center multi-spar box and aligned with the second trim actuator fitting and the second pivot joint.

9. An aircraft including the horizontal stabilizer assembly of claim 1, the aircraft comprising an aircraft fuselage having a plurality of frame members and an outer skin, wherein the stabilizer connector assembly is positioned within the aircraft fuselage and is interconnected to one or more of the frame members.

10. A horizontal stabilizer assembly, comprising:
a stabilizer connector assembly having a center multi-spar box including a front spar, a rear spar, at least one mid spar positioned between and spaced apart from the front spar and the rear spar;
a first base rib assembly secured to a first side of the center multi-spar box, the first base rib assembly including a pair of aligned front lateral lugs positioned along a front of the first base rib assembly, a pair of aligned rear lateral lugs positioned along a rear of the first base rib assembly, and at least one pair of opposing middle longitudinal lugs disposed along a top of the first base rib assembly and a bottom of the first base rib assembly and between the front lateral lugs and the rear lateral lugs;
a second base rib assembly secured to a second side of the center multi-spar box, the second base rib assembly including a pair of aligned front lateral lugs positioned along a front of the second base rib assembly, a pair of aligned rear lateral lugs positioned along a rear of the second base rib assembly, at least one pair of opposing middle longitudinal lugs disposed along a top of the second base rib assembly and a bottom of the second base rib assembly and between the front lateral lugs and the rear lateral lugs;
wherein each of the front spar, the rear spar, and the at least one mid spar of the center multi-spar box extend between the first base rib assembly and the second base rib assembly, wherein the at least one mid spar of the center multi-spar box aligns with a respective one of the at least one pair of opposing middle longitudinal lugs of the first base rib assembly and a respective one of the at least one pair of opposing middle longitudinal lugs of the second base rib assembly;
a first horizontal stabilizer having a first multi-spar box;
a third base rib assembly secured to the first multi-spar box, the third base rib assembly including a front lateral lug positioned along a front of the third base rib assembly, a rear lateral lug positioned along a rear of the third base rib assembly, at least one pair of opposing middle longitudinal lugs disposed along a top of the third base rib assembly and a bottom of the third base rib assembly and between the front lateral lug and the rear lateral lug;
a second horizontal stabilizer having a second multi-spar box;
a fourth base rib assembly secured to the second multi-spar box, the fourth base rib assembly including a front lateral lug positioned along a front of the fourth base rib assembly, a rear lateral lug positioned along a rear of the fourth base rib assembly, at least one pair of opposing middle longitudinal lugs disposed along a top of the fourth base rib assembly and a bottom of the fourth base rib assembly and between the front lateral lug and the rear lateral lug; and
a plurality of retaining members inserted through mounting holes in corresponding lugs in the first and third base ribs and through mounting holes in corresponding lugs of the second and fourth base ribs to secure the first horizontal stabilizer and the second horizontal stabilizer to the stabilizer connector assembly.

11. The horizontal stabilizer assembly of claim 10, wherein:
the center multi-spar box includes a top skin extending between the front spar and the rear spar, and a bottom skin disposed opposite the top skin and extending between the front spar and the rear spar;
the first multi-spar box including a front spar, a rear spar, at least one mid spar positioned between and spaced apart from the front and rear spars, a top skin extending between the front spar and the rear spar, and a bottom skin disposed opposite the top skin and extending between the front spar and the rear spar; and
the second multi-spar box including a front spar, a rear spar, at least one mid spar positioned between and spaced apart from the front and rear spars, a top skin extending between the front spar and the rear spar, and a bottom skin disposed opposite the top skin and extending between the front spar and the rear spar.

12. The horizontal stabilizer assembly of claim 11, comprising:
a first side plate adjacent an exterior surface of the top skin of the center multi-spar box and secured to the top skin and the first base rib assembly, the first side plate having at least one longitudinal lug aligned with and spaced apart from one of the pair of opposing middle longitudinal lugs of the first base rib assembly;
a second side plate adjacent an exterior surface of the bottom skin of the center multi-spar box and secured to the bottom skin and the first base rib assembly, the second side plate having at least one longitudinal lug aligned with and spaced apart from the other of the pair of opposing middle longitudinal lugs of the first base rib assembly;
a third side plate adjacent an exterior surface of the top skin and secured to the top skin and the second base rib assembly, the third side plate having at least one longitudinal lug aligned with and spaced apart from one of the pair of opposing middle longitudinal lugs of the second base rib assembly; and a fourth side plate adjacent an exterior surface of the bottom skin and secured to the bottom skin and the second base rib assembly, the fourth side plate having at least one longitudinal lug aligned with and spaced apart from the other of the pair of opposing middle longitudinal lugs of the second base rib assembly.

13. The horizontal stabilizer assembly of claim 11, wherein:

the first horizontal stabilizer includes a first pivot joint secured to the rear spar of the first multi-spar box and a first plurality of riblets longitudinally aligned between the front, mid, and rear spars of the first multi-spar box and aligned with the first pivot joint; and the second horizontal stabilizer includes a second pivot joint secured to the rear spar of the second multi-spar box and a second plurality of riblets longitudinally aligned between the front, mid, and rear spars of the second multi-spar box and aligned with the second pivot joint.

14. The horizontal stabilizer assembly of claim 13, wherein the stabilizer connector assembly includes first and second trim actuator fittings secured to the front spar of the center multi-spar box, a third plurality of riblets longitudinally aligned between the front, mid, and rear spars of the center multi-spar box and aligned with the first trim actuator fitting, and a fourth plurality of riblets longitudinally aligned between the front, mid, and rear spars of the center multi-spar box and aligned with the second trim actuator fitting.

15. The horizontal stabilizer assembly of claim 11, wherein the stabilizer connector assembly includes first and second trim actuator fittings secured to the front spar of the center multi-spar box, first and second pivot joints secured to the rear spar of the center multi-spar box, a first plurality of riblets longitudinally aligned between the front, mid, and rear spars of the center multi-spar box and aligned with the first trim actuator fitting and the first pivot joint, and a second plurality of riblets longitudinally aligned between the front, mid, and rear spars of the center multi-spar box and aligned with the second trim actuator fitting and the second pivot joint.

16. An aircraft including the horizontal stabilizer assembly of claim 10, the aircraft comprising an aircraft fuselage having a plurality of frame members and an outer skin, wherein the stabilizer connector assembly is positioned within the aircraft fuselage and is interconnected to one or more of the frame members.

17. A method of assembling a horizontal stabilizer assembly for an aircraft, comprising the steps of:

assembling first and second base rib assemblies, each of the first and second base rib assemblies including lug and clevis connections having a plurality of lugs;

positioning the first base rib assembly adjacent a first side of a center multi-spar box of a stabilizer connector assembly and the second base rib assembly adjacent a second side of the center multi-spar box, opposite the first side, wherein the center multi-spar box includes a front spar, a rear spar, at least one mid spar positioned between and spaced apart from the front spar and the rear spar, and wherein each of the front spar, the rear spar, and the at least one mid spar of the center multi-spar box extend between a respective pair of the lug and clevis connections, wherein the at least one mid spar of the center multi-spar box aligns with the respective pair of the lug and clevis connections;

positioning a plurality of side plates corresponding to the plurality of lugs of the first and second base rib assemblies adjacent the center multi-spar box and securing the plurality of side plates to the center multi-spar box and the first base rib assembly, the plurality of side plates having at least one longitudinal lug aligned with and spaced apart from one of the plurality of lugs of the first and second base rib assemblies;

assembling third and fourth base rib assemblies, each of the third and fourth base rib assemblies including a plurality of lugs;

positioning the third base rib assembly adjacent a first multi-spar box of a first horizontal stabilizer and securing the third base rib assembly to the first multi-spar box and positioning the fourth base rib assembly adjacent a second multi-spar box of a second horizontal stabilizer and securing the fourth base rib assembly to the second multi-spar box;

positioning the first horizontal stabilizer adjacent the first side of the center multi-spar box and the second horizontal stabilizer adjacent the second side of the center multi-spar box; and inserting retaining members through mounting holes in corresponding lugs in the first and third base rib assemblies and through mounting holes in corresponding lugs of the second and fourth base rib assemblies to secure the first horizontal stabilizer and the second horizontal stabilizer to the stabilizer connector assembly.

18. The method of claim 17, wherein:

the plurality of lugs of the first and second base rib assemblies comprise a pair of aligned front lateral lugs positioned along a front of the first and second base rib assemblies, a pair of aligned rear lateral lugs positioned along a rear of the first and second base rib assemblies, and at least one pair of opposing middle longitudinal lugs disposed along a top of the first and second base rib assemblies and a bottom of the first and second base rib assemblies and between the front lateral lugs and the rear lateral lugs;

the plurality of side plates comprise a first side plate, a second side plate, a third side plate, and a fourth side plate; and the plurality of lugs of the third and fourth base rib assemblies comprise a front lateral lug positioned along a front of the third and fourth base rib assemblies, a rear lateral lug positioned along a rear of the third and fourth base rib assemblies, at least one pair of opposing middle longitudinal lugs disposed along a top of the third and fourth base rib assemblies and a bottom of the third base rib assembly and between the front lateral lug and the rear lateral lug.

19. The method of claim 18, wherein:

assembling the first and second base rib assemblies comprises: attaching at least one first side chord to a base rib, the at least one first side chord including at least one of the longitudinal lugs; attaching at least one second side chord to the base rib, opposite the at least one first side chord, the at least one second side chord including at least one of the longitudinal lugs; attaching a front terminal fitting to the base rib, the front terminal fitting including the pair of aligned front lateral lugs; and attaching a rear terminal fitting to the base rib, opposite the front terminal fitting, the rear terminal fitting including the pair of aligned rear lateral lugs; and assembling the third and fourth base rib assemblies comprises: attaching at least one first side chord to a base rib, the at least one first side chord including at least one of the longitudinal lugs; attaching at least one second side chord to the base rib, opposite the at least one first side chord, the at least one second side chord including at least one of the longitudinal lugs; attaching a front terminal fitting to the base rib, the front terminal fitting including the front lateral lug; and attaching a rear terminal fitting to the base rib, opposite the front terminal fitting, the rear terminal fitting including the rear lateral lug.

20. The method of claim 17, wherein:

the center multi-spar box including a top skin extending between the front spar and the rear spar, and a bottom skin disposed opposite the top skin and extending between the front spar and the rear spar;

the first multi-spar box including a front spar, a rear spar, at least one mid spar positioned between and spaced apart from the front spar and a rear spar, a top skin extending between the front spar and the rear spar, and a bottom skin disposed opposite the top skin and extending between the front spar and the rear spar; and the second multi-spar box including a front spar, a rear spar, at least one mid spar positioned between and spaced apart from the front spar and a rear spar, a top skin extending between the front spar and the rear spar, and a bottom skin disposed opposite the top skin and extending between the front spar and the rear spar.

21. The method of claim 20, comprising the steps of:

securing a first pivot joint to the rear spar of the first multi-spar box and securing one of a first plurality of riblets between each spar of the first multi-spar box, the first plurality of riblets being longitudinally aligned with each other and aligned with the first pivot joint; and securing a second pivot joint to the rear spar of the second multi-spar box and securing one of a second plurality of riblets between each spar of the second multi-spar box, the second plurality of riblets being longitudinally aligned with each other and aligned with the second pivot joint.

22. The method of claim 21, comprising the steps of:

securing first and second trim actuator fittings to the front spar of the center multi-spar box;

securing one of a third plurality of riblets between each spar of the center multi-spar box, the third plurality of riblets being longitudinally aligned with each other and with the first trim actuator fitting; and securing one of a fourth plurality of riblets between each spar of the center multi-spar box, the fourth plurality of riblets being longitudinally aligned with each other and with the second trim actuator fitting.

23. The method of claim 20, comprising the steps of:

securing first and second trim actuator fittings to the front spar of the center multi-spar box;

securing first and second pivot joints to the rear spar of the center multi-spar box;

securing one of a first plurality of riblets between each spar of the center multi-spar box, the first plurality of riblets being longitudinally aligned with each other and with the first trim actuator fitting and the first pivot joint; and securing one of a second plurality of riblets between each spar of the center multi-spar box, the second plurality of riblets being longitudinally aligned with each other and with the second trim actuator fitting and the second pivot joint.

* * * * *